United States Patent
Hayashi et al.

(10) Patent No.: US 8,906,505 B2
(45) Date of Patent: Dec. 9, 2014

(54) COMPOSITION FOR COLLOIDAL CRYSTAL COMPRISING CORE-SHELL PARTICLES AND STYRENE POLYMER

(75) Inventors: Masaki Hayashi, Tokyo (JP); Masumi Takamura, Tokyo (JP)

(73) Assignee: NOF Corporation, Tokyo (JP)

( * ) Notice: Subject to any disclaimer, the term of this patent is extended or adjusted under 35 U.S.C. 154(b) by 216 days.

(21) Appl. No.: 13/806,593

(22) PCT Filed: Jun. 1, 2011

(86) PCT No.: PCT/JP2011/062594
§ 371 (c)(1),
(2), (4) Date: Mar. 14, 2013

(87) PCT Pub. No.: WO2011/162078
PCT Pub. Date: Dec. 29, 2011

(65) Prior Publication Data
US 2013/0171438 A1    Jul. 4, 2013

(30) Foreign Application Priority Data

Jun. 25, 2010   (JP) ................. 2010-144494

(51) Int. Cl.
| | | |
|---|---|---|
| *B32B 5/16* | (2006.01) | |
| *B05D 7/00* | (2006.01) | |
| *C09D 139/04* | (2006.01) | |
| *B32B 5/14* | (2006.01) | |
| *B32B 7/02* | (2006.01) | |
| *C08F 2/44* | (2006.01) | |
| *C08F 285/00* | (2006.01) | |
| *G02B 1/02* | (2006.01) | |
| *C08F 220/30* | (2006.01) | |
| *C08F 222/10* | (2006.01) | |

(52) U.S. Cl.
CPC .............. *C09D 139/04* (2013.01); *B32B 5/14* (2013.01); *B32B 7/02* (2013.01); *B05D 2401/10* (2013.01); *C08F 2/44* (2013.01); *C08F 285/00* (2013.01); *C08F 2220/306* (2013.01); *C08F 2222/102* (2013.01); *G02B 1/02* (2013.01)
USPC .......... 428/407; 427/180; 427/189; 427/201; 427/332; 427/372.2; 428/327

(58) Field of Classification Search
CPC ......... B05D 2401/10; C08J 3/24; C08D 4/60; C08D 109/06; C08D 125/06
USPC .......... 428/403–407; 427/180, 189, 201, 335, 427/372.2, 384
See application file for complete search history.

(56) References Cited

U.S. PATENT DOCUMENTS

| | | | | |
|---|---|---|---|---|
| 6,337,131 | B1 * | 1/2002 | Rupaner et al. | 428/403 |
| 6,582,807 | B2 * | 6/2003 | Baer et al. | 428/212 |
| 6,982,117 | B2 * | 1/2006 | Smith et al. | 428/323 |
| 2007/0298337 | A1 * | 12/2007 | Hayashi | 430/32 |
| 2008/0305968 | A1 | 12/2008 | Nakamura et al. | |

FOREIGN PATENT DOCUMENTS

| | | |
|---|---|---|
| JP | 06-100432 A | 4/1994 |
| JP | 2005-060654 A | 3/2005 |
| JP | 2007-029775 A | 2/2007 |
| JP | 2008-303261 A | 12/2008 |
| JP | 2009-249527 A | 10/2009 |
| JP | 2010-018760 A | 1/2010 |
| WO | WO 03/100139 A1 | 12/2003 |
| WO | WO 2005/108451 A1 | 11/2005 |

* cited by examiner

*Primary Examiner* — Holly Le
(74) *Attorney, Agent, or Firm* — Patterson Thuente Pedersen P.A.

(57) ABSTRACT

A composition for colloidal crystals including core-shell particles and a monomer having a particular structure. The core-shell particles constitute 25% to 65% by weight of the composition, and the monomer constitutes 35% to 75% by weight of the composition. The core has an average particle size from 50 to 900 nm. Each particle includes a core and a shell. The shell is formed of a linear polymer composed of at least one of styrene and a monomer having a particular structure. One end of the linear polymer is covalently bonded to the core. The refractive index of the core (n(core)) satisfies the following formulae: wherein $R_1$ denotes a hydrogen atom or a methyl group, and y is 0 or 1, n(shell)−n(core)≥0.07, n(shell) denoting the refractive index of the shell, and n(B)−n(core)≥0.07, n(B) denoting the refractive index of the monomer (B1) after curing.

9 Claims, No Drawings

COMPOSITION FOR COLLOIDAL CRYSTAL COMPRISING CORE-SHELL PARTICLES AND STYRENE POLYMER

PRIORITY CLAIM

The present application is a National Phase entry of PCT Application No. PCT/JP2011/062594, filed Jun. 1, 2011, which claims priority from Japanese Patent Application No. 2010-144494, filed Jun. 25, 2010, the disclosures of which are hereby incorporated by reference herein in their entirety.

BACKGROUND OF THE INVENTION

The present disclosure relates to a composition with which a coloring material for presenting a structural color and colloidal crystals usable as an optical element can be produced, a colloidal crystal film formed of the composition, and a method for manufacturing the colloidal crystal cured film. A composition for colloidal crystals and a colloidal crystal cured film according to the present disclosure are useful for applications in the optical technical field, such as optical elements and optical functional materials.

An accumulation of monodisperse particles three-dimensionally regularly arranged is referred to as colloidal crystals. The colloidal crystals cause the diffraction or interference of incident light and, depending principally on its periodic structure, reflect light having a particular wavelength (Bragg reflection). For example, colloidal crystals of submicron particles reflect ultraviolet light to visible light and infrared light, depending on the particle size. When the reflected light has a wavelength in the visible light region, the color of the colloidal crystals can be visually recognized as a structural color. Colloidal crystals have been actively studied and are expected to be used in various optical elements and optical functional materials, such as photonic crystals. For example, colloidal crystals can be applied to various coloring materials, such as paints, inks, and cosmetics, optical filters, optical memory materials, display devices, optical switches, sensors, and lasers.

Many studies have reported methods for producing colloidal crystals. Colloidal crystals are roughly divided into "closest packed (hard)" and "non-closest packed" colloidal crystals. "Non-closest packed" colloidal crystals are further divided into "non-closest packed (soft)" colloidal crystals and "non-closest packed (semi-soft)" colloidal crystals.

"Closest packed (hard)" colloidal crystals are an accumulation of particles, for example, of silica or polystyrene closely packed, and particles in the colloidal crystals are in contact with one another. Crystals can be grown through the accumulation of particles associated with the evaporation of water-soluble solvent, yielding dry colloidal crystals. Thus, an infinite number of voids are present between the particles. The hard colloidal crystals are composed of particles accumulated only by contact and therefore have very low mechanical strength, and are broken by the action of a slight external force. Thus, according to one disclosed production process, in order to fill the voids between particles with a binder, such as a monomer or a polymer, the binder is applied to the colloidal crystals (see, for example, JP2005-60654A). According to another disclosed production process, core-shell particles prepared by two-stage emulsion polymerization in which the surface of the core (particle) is coated with a resin of the shell are used to fill the voids between particles with the shell (see, for example, JP2009-249527A).

According to still another disclosure, "non-closest packed (soft)" colloidal crystals can be produced by removing an ionic substance from a particle dispersion containing a water-soluble solvent as a dispersion medium (see, for example, JP06-100432A). According to this production process, deionization expands an electric double layer on the particle surface and causes electrostatic repulsion between the particles. This suppresses Brownian movement of the particles and regularly arranges the particles throughout the dispersion medium. Since "soft" colloidal crystals contain a liquid dispersion medium, the regular arrangement of particles is easily broken by a slight external force, such as vibrations, or a temperature change. Thus, in order to put "soft" colloidal crystals to practical use as a material, the colloidal crystals must be immobilized while the regular arrangement of particles is maintained. According to another disclosed production process, a small amount of water-soluble monomer is added to a water-soluble solvent, and the monomer is polymerized to immobilize colloidal crystals with the polymer gel (see, for example, JP2007-29775A). An immobilization method using no solvent is also disclosed (see JP2008-303261A).

"Non-closest packed (semi-soft)" colloidal crystals contain core-shell particles in which a linear polymer of the shell is bonded to the surface of the particle (core). The core-shell particles prepared by two-stage emulsion polymerization described in JP2009-249527A, in which the surface of the core is coated with a resin of the shell, are different from the core-shell particles used in "semi-soft" colloidal crystals. The linear polymer of the core-shell particles used in "semi-soft" colloidal crystals can dissolve in an organic solvent. However, the linear polymer bonded to the surface of the core is not detached from the core and contributes to the dispersion stabilization of the core. In the dispersion of core-shell particles in an organic solvent, the steric repulsion of a linear polymer or osmotic effects prevent the aggregation of particles, thus forming colloidal crystals (see, for example, WO 2005-108451). Restrictions on the solvent usable as a dispersion medium are less stringent in the case of "semi-soft" colloidal crystals than in the case of "soft" colloidal crystals. Thus, "semi-soft" colloidal crystals can form colloidal crystals even in a hydrophobic organic solvent or a hydrophobic monomer. "Semi-soft" colloidal crystals are also superior to "soft" colloidal crystals in that the particle spacing in a crystalline state can be controlled via the molecular weight of the linear polymer. However, "semi-soft" colloidal crystals contain a liquid dispersion medium as in "soft" colloidal crystals. Thus, in order to put "semi-soft" colloidal crystals to practical use, the colloidal crystals must be immobilized while the regular arrangement of particles is maintained. According to another disclosed method, a small amount of monomer is added to the organic solvent of "semi-soft" colloidal crystals and is polymerized to immobilize the colloidal crystals with the polymer gel (see, for example, WO 2003-100139).

In a drying process of a particle dispersion for "hard" colloidal crystals described in JP2005-60654A, the addition of a hydrophobic binder causes the aggregation of the particles, resulting in an irregular arrangement of the particles (JP2009-249527A (see p. 14)). Although a binder is applied to colloidal crystals thus formed, the colloidal crystals may be broken. In order to avoid this, according to one disclosed production process, an adhesive layer is formed on a substrate in advance. However, this requires complicated procedures with many steps. Furthermore, it is difficult to completely fill the voids between particles with the binder, and disordered voids often remain. The residual disordered voids cause light scattering and consequently cloudiness in the resulting colloidal crystals. The hard colloidal crystals tend to have an infinite number of cracks in its coating film during the drying process. This is because, with decreasing interparticle distance during the drying process, uneven shrinkage results in the breakage of part of the crystals, thus causing cracks. These cracks have various sizes and may be large enough for visual observation or may be microcracks of several micrometers, which are difficult to visually observe. An infinite number of these cracks also scatter light and cause cloudiness in the resulting colloidal crystals. According to one disclosed method, in order to prevent cracking, colloidal crystals are formed on a substrate having trench isolation. This method requires a substrate having a particular shape (see, for example, JP2005-60654A). According to the method using the core-shell particles synthesized by the two-stage emulsion polymerization described in JP2009-249527A, the resin that fills the voids is a polymer having less flowability than low-molecular binders. It is therefore difficult to completely fill the voids with the resin. Furthermore, it is difficult to prevent all cracks only with the polymer of the shell. Thus, there are problems that the immobilization of colloidal crystals requires complicated procedures or substrates, and residual voids or cracks cause cloudiness.

"Soft" colloidal crystals described in JP2007-29775A and JP2008-303261A are formed utilizing the electrostatic repulsion of the surface charges of particles. This requires the use of a water-soluble solvent having a high dielectric constant as a dispersion medium. Thus, the colloidal crystals are immobilized only in a gel state in the presence of the water-soluble solvent. The "semi-soft" colloidal crystals including the core-shell particles described in WO 2005-108451 and WO 2003-100139 are formed using a hydrophobic monomer as a dispersion medium. Thus, the colloidal crystals are supposed to be immobilized as a cured film by curing (polymerizing) the monomer. However, a regular arrangement of particles is likely to be broken during the polymerization of the monomer. Thus, there is a problem that the optical properties cannot sufficiently be maintained through the curing. This is probably because of the mass transfer or cure shrinkage of the monomer during the polymerization. Thus, the regular arrangement of particles is difficult to maintain during the immobilization of the colloidal crystals. The colloidal crystals immobilized by the method described in JP2010-18760A are immobilized as a gel containing an organic solvent, which constitutes approximately 50% of the gel. Thus, colloidal crystals immobilized as a gel containing a water-soluble solvent or an organic solvent have low mechanical strength and are therefore difficult to put to practical use in optical functional materials. Furthermore, the evaporation of the solvent may disorder the regular arrangement of particles or change the interparticle distance. This changes the reflection wavelength, resulting in poor stability. According to the method described in JP2008-303261A, the solvent content is 30% by weight or less, and a monomer used as a binder is limited to a water-soluble poly(alkylene glycol) monomer.

In order to solve such problems, the present inventors previously found a method for manufacturing a cured film for presenting a bright structural color by limiting the solubility parameters of a shell of core-shell particles (A) and a binder monomer (B) in "semi-soft" colloidal crystals and limiting the acrylic equivalent of the monomer (B) JP2010-18760A. Advantageously, a cured film manufactured by this method has high mechanical strength and excellent stability because of the absence of solvent evaporation and can form a film for presenting a structural color by a simple method.

However, the colloidal crystal cured film disclosed in JP2010-18760A suffers from still insufficient curing and has a high haze because of slight residual cloudiness.

When a colloidal crystal cured film for presenting a structural color is used as a coloring material, such as a paint, necessary optical properties include sufficiently high reflectance at a reflection peak presenting the color, a low haze, and high transparency. The reflectance at a reflection peak may be increased by increasing the film thickness and the number of colloidal crystal layers. However, this also increases the haze. In general, in order to use a colloidal crystal cured film as a coloring material, the reflectance at a reflection peak must be 50% or more, and the haze must be 10% or less.

Thus, there has been a need for improved compositions for colloidal crystals.

BRIEF SUMMARY OF THE INVENTION

As a result of extensive studies to achieve the object described above, the present inventors found that a composition for colloidal crystals that contains core-shell particles and a binder monomer having a high refractive index can improve the optical properties of a colloidal crystal cured film. The shell contains a linear polymer having a higher refractive index than the core.

A first aspect of the present disclosure is a composition for colloidal crystals, including: core-shell particles (A) each having a core and a shell; and a monomer (B1) having the following formula (1), wherein the core-shell particles (A) constitute 25% to 65% by weight of the composition, and the monomer (B1) constitutes 35% to 75% by weight of the composition, the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (2) and (3):

[Chem. 1]

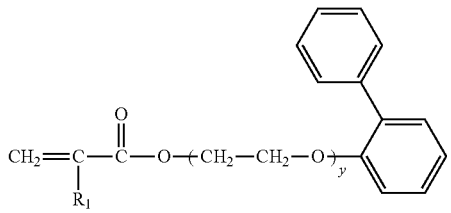
(1)

[Chem. 2]

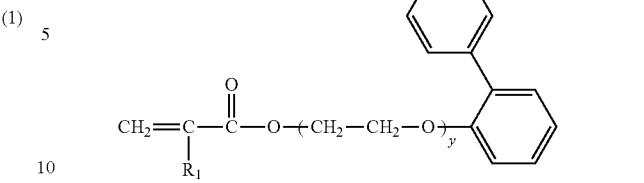
(1)

wherein $R_1$ denotes a hydrogen atom or a methyl group, and y is 0 or 1,

[Chem. 3]

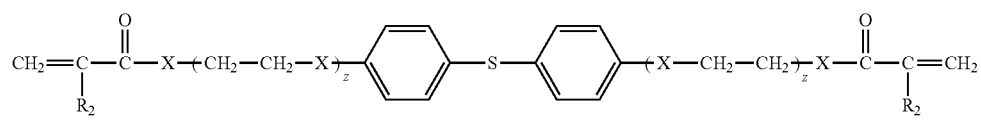
(4)

wherein $R_1$ denotes a hydrogen atom or a methyl group, and y is 0 or 1, $$n(\text{shell}) - n(\text{core}) \geq 0.07 \quad (2)$$

wherein n(shell) denotes the refractive index of the shell, and $$n(B) - n(\text{core}) \geq 0.07 \quad (3)$$

wherein n(B) denotes the refractive index of the monomer (B1) after curing.

A second aspect of the present disclosure is a composition for colloidal crystals, including: core-shell particles (A) each having a core and a shell; and a mixture of a monomer (B1) having the following formula (1) and a monomer (C1) having the following formula (4), wherein the core-shell particles (A) constitute 25% to 65% by weight of the composition, and the mixture constitutes 35% to 75% by weight of the composition, the monomer (B1) constituting 5% by weight or more of the composition, the monomer (C1) constituting 70% by weight or less of the composition, the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (3) and (5):

wherein $R_2$ denotes a hydrogen atom or a methyl group, X denotes an oxygen atom or a sulfur atom, and z is 0 or 1, $$n(\text{shell}) - n(\text{core}) \geq 0.07 \quad (3)$$

wherein n(shell) denotes the refractive index of the shell, and $$n(B+C) - n(\text{core}) \geq 0.07 \quad (5)$$

wherein n(B+C) denotes the refractive index of the mixture after curing.

A third aspect of the present disclosure is a composition for colloidal crystals, including: core-shell particles (A) each having a core and a shell; and a mixture of a monomer (B1) having the following formula (1) and a monomer (C2) having the following formula (6), wherein the core-shell particles (A) constitute 25% to 65% by weight of the composition, and the mixture constitutes 35% to 75% by weight of the composition, the monomer (B1) constituting 5% by weight or more of the composition, the monomer (C2) constituting 70% by weight or less of the composition, the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (3) and (7):

[Chem. 4]

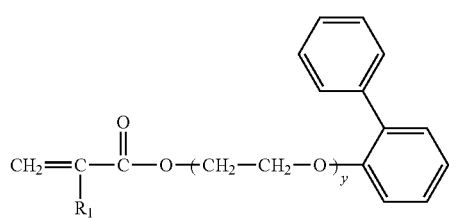

(1)

wherein $R_1$ denotes a hydrogen atom or a methyl group, and y is 0 or 1,

[Chem. 5]

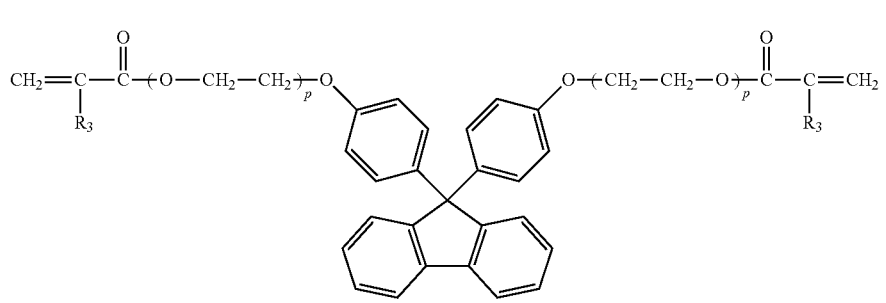

(6)

wherein $R_3$ denotes a hydrogen atom or a methyl group, and p is 1 or 2, $$n(\text{shell}) - n(\text{core}) \geq 0.07 \quad (3)$$

wherein n(shell) denotes the refractive index of the shell, and $$n(B+C) - n(\text{core}) \geq 0.07 \quad (7)$$

wherein n(B+C) denotes the refractive index of the mixture after curing.

[Chem. 7]

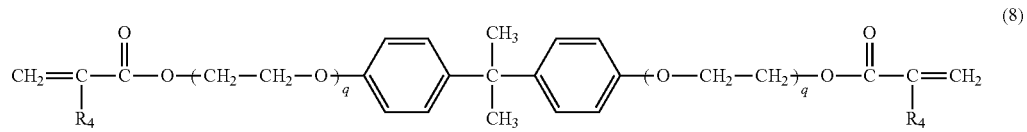

(8)

A fourth aspect of the present disclosure is a composition for colloidal crystals, including: core-shell particles (A) each having a core and a shell; and a mixture of a monomer (B1) having the following formula (1) and a monomer (C3) having the following formula (8), wherein the core-shell particles (A) constitute 25% to 65% by weight of the composition, and the mixture constitutes 35% to 75% by weight of the composition, the monomer (B1) constituting 5% by weight or more of the composition, the monomer (C3) constituting 70% by weight or less of the composition, the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (3) and (9):

[Chem. 6]

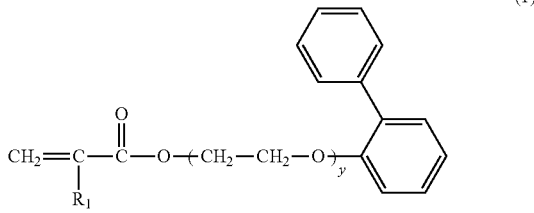

(1)

wherein $R_1$ denotes a hydrogen atom or a methyl group, and y is 0 or 1, wherein $R_4$ denotes a hydrogen atom or a methyl group, and q is 1 or 2, $$n(\text{shell}) - n(\text{core}) \geq 0.07 \quad (3)$$

wherein n(shell) denotes the refractive index of the shell, and $$n(B+C) - n(\text{core}) \geq 0.07 \quad (9)$$

wherein n(B+C) denotes the refractive index of the mixture after curing.

A fifth aspect of the present disclosure is a composition for colloidal crystals, including: core-shell particles (A) each having a core and a shell; and a mixture of a monomer (B1) having the following formula (1) and a monomer (C), wherein the core-shell particles (A) constitute 25% to 65% by weight of the composition, and the mixture constitutes 35% to 75% by weight of the composition, the monomer (B1) constituting 5% by weight or more of the composition, the monomer (C) constituting 70% by weight or less of the composition, the monomer (C) includes at least two of a monomer (C1) having the following formula (4), a monomer (C2) having the following formula (6), and a monomer (C3) having the following formula (8), the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (3) and (10):

[Chem. 8]

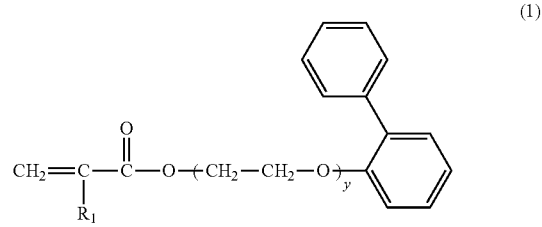

(1)

wherein $R_1$ denotes a hydrogen atom or a methyl group, and y is 0 or 1,

[Chem. 9]

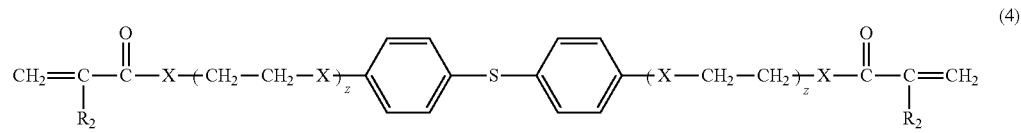

(4)

wherein $R_2$ denotes a hydrogen atom or a methyl group, X denotes an oxygen atom or a sulfur atom, and z is 0 or 1,

[Chem. 10]

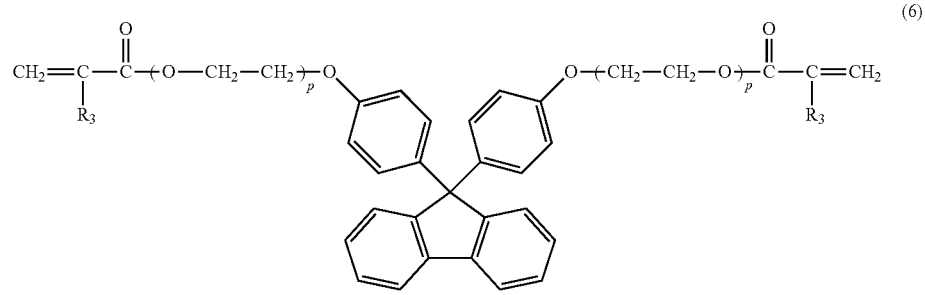

(6)

wherein $R_3$ denotes a hydrogen atom or a methyl group, and p is 1 or 2,

[Chem. 11]

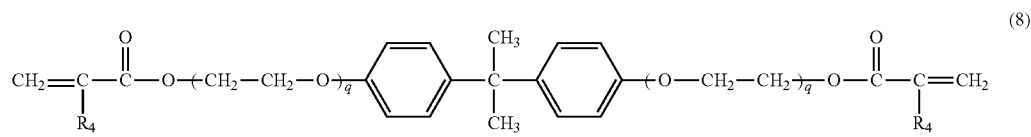

(8)

wherein R₄ denotes a hydrogen atom or a methyl group, and q is 1 or 2, $$n(\text{shell}) - n(\text{core}) \geq 0.07 \quad (3)$$

wherein n(shell) denotes the refractive index of the shell, and $$n(B+C) - n(\text{core}) \geq 0.07 \quad (10)$$

wherein n(B+C) denotes the refractive index of the mixture after curing.

A sixth aspect of the present disclosure is the composition for colloidal crystals according to any one of the first to fifth aspects further containing 0.1 to 10 parts by weight of a polymerization initiator per 100 parts by weight of the composition for colloidal crystals.

A seventh aspect of the present disclosure is the composition for colloidal crystals according to any one of the first to sixth aspects further containing 5 to 500 parts by weight of an organic solvent per 100 parts by weight of the composition for colloidal crystals.

An eighth aspect of the present disclosure is a colloidal crystal cured film manufactured by curing the composition for colloidal crystals according to any one of the first to seventh aspects using heat or an active energy beam, wherein the colloidal crystal cured film has a thickness in the range of 1 to 100 μm.

A ninth aspect according to the present disclosure is a method for manufacturing a colloidal crystal cured film having a thickness in the range of 1 to 100 μm, including applying the composition for colloidal crystals according to the seventh aspect to a substrate, and then evaporating the organic solvent to form colloidal crystals, and curing the crystallized composition using heat or an active energy beam.

Although the reason that a composition for colloidal crystals according to the present disclosure can achieve the object described above is not entirely clear, the present inventors surmise the reason as described below. In the curing of the binder monomer (B1) and one of the monomers (C1 to C3), good miscibility between the linear polymer of the shell of the core-shell particles (A) and a cured product of the monomer (B1) and the other monomer (C1, C2, or C3) is considered to be particularly important in maintaining the regular arrangement of particles during the curing process. In the case that they are immiscible, the shell is dissolved in the monomer (B1) and the other monomer (C1, C2, or C3) before curing and thereby contributes to the dispersion stability of the particles. However, the phase separation of the shell during the curing process causes the aggregation of the particles and disorders the regular arrangement of the particles. The control by means of the solubility parameters in JP2010-18760A was insufficient. In the composition for colloidal crystals, when the linear polymer of the shell is formed of the aromatic monomer and when the monomer (B1) and the monomers (C1 to C3) are the aromatic monomers, their π-π interaction effectively acts on miscibility and allows the regular arrangement of particles to be maintained during the curing process.

In order to increase the reflectance of a colloidal crystal cured film at a reflection peak, it is important to increase the difference in refractive index between the particles and a matrix around the particles. With respect to non-closest packed (soft, semi-soft) colloidal crystals, although colloidal crystals that contain particles having a high refractive index and a matrix having a low refractive index have been disclosed, there is no production example of colloidal crystals that contain particles having a low refractive index and a matrix having a high refractive index and in which the difference in refractive index between the particles and the matrix is 0.07 or more. The effects of such a difference in refractive index on optical properties are under investigation but are considered to be effective in improving the optical properties.

With the composition for colloidal crystals according to the first aspect, colloidal crystals having excellent particle dispersion stability can be formed because of excellent solubility of the shell of the core-shell particles (A) and the monomer (B1). Furthermore, the polymerization and curing of the monomer (B1) allows the colloidal crystals to be immobilized while maintaining a regular arrangement of particles. The difference in refractive index between the core and the shell and the difference in refractive index between the core and the monomer (B1) satisfy the conditions represented by the formulae (2) and (3). Thus, a colloidal crystal cured film having good optical properties can be manufactured. Furthermore, since the core has an average particle size in the range of 50 to 900 nm, the Bragg reflection wavelength of the colloidal crystal cured film is in the range of ultraviolet light to infrared light. Thus, the colloidal crystal cured film can be practically used in various optical elements.

With the composition for colloidal crystals according to the second to fifth aspects, a colloidal crystal cured film having substantially the same advantages as the first aspect can be manufactured. The monomer (B1) and one of the monomers (C1 to C3) form a cross-linked structure. Thus, the colloidal crystal cured film can have improved thermal properties, such as heat resistance, and mechanical characteristics, such as hardness, and chemical resistance.

With the composition for colloidal crystals according to the sixth aspect, a colloidal crystal cured film that retains a regular arrangement of particles can be easily manufactured because of rapid polymerization and curing of the monomer (B1) and the other monomer (C1 to C3) of the composition for colloidal crystals according to any one of the first to fifth aspects.

In the composition for colloidal crystals according to the seventh aspect, the presence of the organic solvent in the composition for colloidal crystals according to any one of the first to sixth aspects can improve the dispersion of the core-shell particles and the viscosity control and applicability of the composition. Furthermore, drying the organic solvent after coating can promote the colloidal crystallization of the composition.

The colloidal crystal cured film according to the eighth aspect is manufactured by curing the monomer (B1) and the other monomer (C1 to C3) of the composition for colloidal crystals according to any one of the first to seventh aspects and exhibits Bragg reflection. The colloidal crystal cured film retains a regular arrangement of particles and has excellent optical properties. The colloidal crystal cured film has thermal properties, mechanical characteristics, and chemical resistance required for practical use as an optical functional material.

According to the method for manufacturing a colloidal crystal cured film according to the ninth aspect, a colloidal crystal cured film having substantially the same advantages as the eighth aspect can be efficiently manufactured by a simple process. This method requires no substrate or plate having a particular shape. Thus, the colloidal crystal cured film can be formed on a three-dimensional formed product.

DETAILED DESCRIPTION OF THE INVENTION

A composition for colloidal crystals according to the present disclosure includes core-shell particles (A) each having a core and a shell and a monomer (B1), or the core-shell particles (A) and a mixture of the monomer (B1) and one of other monomers (C1 to C3). These components, the composition for colloidal crystals, a cured film manufactured using the composition, and a method for manufacturing the cured film will be described in detail below.

<Monomer (B)>

The monomer (B) (monomer (B1) or monomer (B2)) is a (meth)acrylate compound having a biphenyl skeleton represented by the following formula (1):

[Chem. 12]

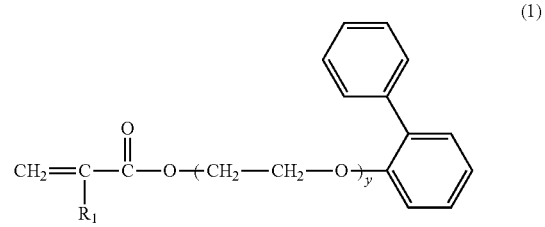

(1)

wherein $R_1$ denotes a hydrogen atom or a methyl group, and y is 0 or 1.

The monomer (B1) and the monomer (B2) in a composition for colloidal crystals may be the same compound or different compounds. One or both of the monomer (B1) and the monomer (B2) may contain a plurality of compounds. Examples of the monomer (B) include 2-phenylphenyl(meth)acrylate and 2-phenylphenoxyethyl(meth)acrylate. The term "(meth)acrylate", as used herein, refers to both "acrylate" and "methacrylate". Likewise, the term "(meth)acryl", as used herein, refers to both "acryl" and "methacryl".

<Monomer (C1)>

The monomer (C1) is a di(meth)acrylate compound having a diphenyl sulfide skeleton represented by the following formula (4):

[Chem. 13]

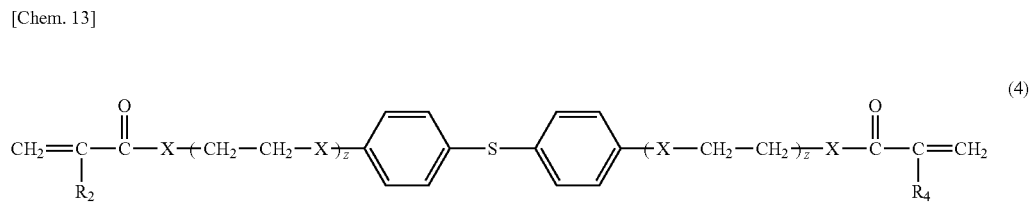

(4)

wherein $R_2$ denotes a hydrogen atom or a methyl group, X denotes an oxygen atom or a sulfur atom, and z is 0 or 1.

Examples of the monomer (C1) include bis(4-(meth)acryloxyphenyl)sulfide, bis(4-(meth)acryloxyethoxyphenyl)sulfide, bis(4-(meth)acryloylthiophenyl)sulfide, and bis(4-(meth)acryloxyethylthiophenyl)sulfide.

<Monomer (C2)>

The monomer (C2) is a di(meth)acrylate compound having a fluorene skeleton represented by the following formula (6):

[Chem. 14]

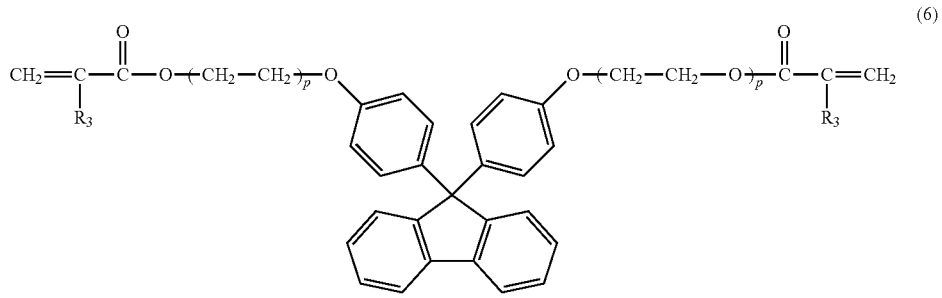

(6)

wherein $R_3$ denotes a hydrogen atom or a methyl group, and p is 1 or 2.

Examples of the monomer (C2) include 9,9-bis[4-(2-(meth)acryloyloxyethoxy)phenyl]fluorene and 9,9-bis[4-(2-(2-(meth)acryloyloxyethoxy)ethoxy)phenyl]fluorene.

<Monomer (C3)>

The monomer (C3) is a di(meth)acrylate having a bisphenol A skeleton represented by the following formula (8):

[Chem. 15]

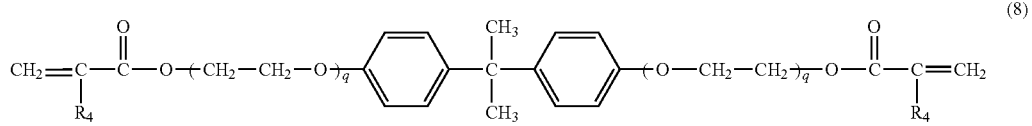

(8)

wherein $R_4$ denotes a hydrogen atom or a methyl group, and q is 1 or 2.

Examples of the monomer (C3) include 2,2-bis[4-(2-(meth)acryloyloxyethoxy)phenyl]propane and 2,2-bis[4-(2-(2-(meth)acryloyloxyethoxy)ethoxy)phenyl]propane.

<Core-Shell Particles (A)>

The core-shell particles (A) have a particle core and a shell formed of a linear polymer bonded to the surface of the core. The core may be an inorganic particle or an organic polymer particle, or a hollow particle containing a void (air) within the inorganic particle or the organic polymer particle. The inorganic particle desirably has a low refractive index and may be composed of magnesium fluoride or silica. In particular, the inorganic particle is preferably composed of silica in terms of refractive index, dispersion stability, and cost. The organic polymer particle may be composed of an acrylic resin, polyester resin, polycarbonate resin, polyamide resin, urethane resin, fluoropolymer, polyolefin resin, or melamine resin, or a copolymer thereof. The organic polymer particle is preferably composed of an acrylic resin because of its low refractive index and the ease with which the particle size can be controlled.

When the core is composed of an acrylic resin, the core may be produced using a (meth)acrylate monomer or a (meth)acrylamide monomer. If necessary, these monomers may be used in combination with another polymerizable monomer, such as a styrene monomer, vinyl acetate, acrylonitrile, a water-soluble monomer, an ionic monomer, or a monomer having another functional group. In order to prevent the core from being deformed by heating or by the action of an organic solvent, a cross-linking monomer having two or more polymerizable groups per molecule may also be used. Examples of the (meth)acrylate monomer include methyl(meth)acrylate, ethyl(meth)acrylate, n-butyl(meth)acrylate, isobutyl(meth)acrylate, tert-butyl(meth)acrylate, cyclohexyl(meth)acrylate, 2-ethylhexyl(meth)acrylate, 2-hydroxyethyl(meth)acrylate, glycidyl(meth)acrylate, methoxyethylene glycol (meth)acrylate, 2-(meth)acryloyloxyethyl isocyanate, N,N-dimethylaminoethyl(meth)acrylate, 2,2,2-trifluoroethyl(meth)acrylate, 2,2,3,3-tetrafluoropropyl(meth)acrylate, and 2-(perfluorohexyl)ethyl(meth)acrylate. Examples of the (meth)acrylamide monomer include N,N-dimethyl(meth)acrylamide and N-isopropyl(meth)acrylamide. Among these, the (meth)acrylate monomer is preferred because of its low refractive index and the ease with which the particle size can be controlled. These monomers may be used alone or in combination for each purpose. Examples of the cross-linking monomer include ethylene glycol di(meth)acrylate, diethylene glycol di(meth)acrylate, 1,4-butanediol di(meth)acrylate, 1,6-hexanediol di(meth)acrylate, trimethylolpropane tri(meth)acrylate, pentaerythritol tetra(meth)acrylate, triallyl isocyanurate, diallyl phthalate, and divinylbenzene.

The core of the core-shell particles (A) has an arithmetic average particle size in the range of 50 to 900 nm as determined by dynamic light scattering. The core preferably has an average particle size in the range of 80 to 600 nm, more preferably 100 to 300 nm. When the core has an average particle size of less than 50 nm, the aggregation of core-shell particles is difficult to reduce. On the other hand, when the core has an average particle size of more than 900 nm, it is difficult to reduce the sedimentation of the core-shell particles and form colloidal crystals. The particle size distribution of the core is represented by CV [(particle size standard deviation/average particle size)×100(%)]. The CV is preferably 25% or less, more preferably 20% or less. For a monodisperse system in which all the particles have the same size, CV is 0%. When the core has CV of more than 25%, colloidal crystals are difficult to form because of different particle sizes.

The shell of the core-shell particles (A) is formed of a linear polymer produced by the polymerization of styrene and/or the monomer (B2) having the formula (1). Under the conditions satisfying the formula (2), styrene and the monomer (B2) may be used alone or in combination. Use of a polymer of styrene and/or the monomer (B2) in the shell can result in a colloidal crystal cured film having increased peak reflectance, decreased haze, and increased transparency.

The linear polymer of the shell has no branched structure, and one end of the linear polymer is covalently bonded to the core. The linear polymer bonded to the core does not detach from the core even when dissolved in a monomer or solvent. This can increase the dispersion stability of the core-shell particles. In conventional core-shell particles, the shell is bonded to the core by physical adsorption or surrounds the core as a three-dimensional network structure. However, the shell bonded by physical adsorption easily detaches from the core and does not improve the dispersion stability of the core-shell particles. The shell surrounding the core as the three-dimensional network structure cannot secure the dispersion stability of the core-shell particles.

The graft ratio (%) of the shell is defined by [(mass of shell/mass of core)×100] and is preferably in the range of 3% to 500%, more preferably 5% to 200%. When the graft ratio of the shell is less than 3%, this results in a reduced steric repulsion effect of the linear polymer, making it difficult to prevent the aggregation of the core-shell particles and form colloidal crystals. When the graft ratio of the shell is more than 500%, colloidal crystals have poor optical properties because of a reduced percentage of the core. The graft ratio of the shell correlates partly with the thickness of the shell. The average particle size of the core-shell particles (A) is the sum of twice the thickness of the shell and the average particle size of the core particle and may be measured utilizing dynamic light scattering. The core-shell particles have an average particle size in the range of 60 to 1,000 nm, preferably 90 to 700 nm, more preferably 110 to 400 nm. When the core-shell particles have an average particle size of less than 60 nm, it is difficult to reduce the aggregation of core-shell particles. When the core-shell particles have an average particle size of more than 1,000 nm, it is difficult to reduce the sedimentation of the core-shell particles and form colloidal crystals.

The reflection wavelength of the resulting colloidal crystals can be controlled depending on the average particle size of the core-shell particles and the core-shell particle content of the composition for colloidal crystals. The particle size of the core-shell particles depends on the particle size of the core and the thickness of the shell. The thickness of the shell partly correlates with the graft ratio. At a graft ratio of 200% or less, the thickness of the shell has a smaller effect than the particle size of the core. Thus, it is more important to control the particle size of the core. For example, if the core-shell particle content of a composition for colloidal crystals is 40% by weight and if the graft ratio is 200% or less, when the core has an average particle size in the range of approximately 100 to 300 nm, the colloidal crystals have a reflection wavelength in the visible light region (400 to 800 nm). When the core has an average particle size in the range of approximately 50 to 100 nm, the colloidal crystals have a reflection wavelength of ultraviolet light (200 to 400 nm). When the core has an average particle size in the range of approximately 300 to 900 nm, the colloidal crystals have a reflection wavelength of near-infrared light (800 to 2500 nm). The reflection wavelength can also be controlled depending on the core-shell particle content of the composition. A higher core-shell particle content of the composition results in a narrower interplanar spacing and a shorter reflection wavelength of the resulting colloidal crystals. For example, when the colloidal crystals have a reflection wavelength in the visible light region, the core-shell particle content of the composition for the colloidal crystals can be changed to control the reflection wavelength within the range of approximately 100 nm.

The core-shell particles (A) are appropriately selected in accordance with a mixture of the monomer (B1) and one of the other monomers (C1 to C3) in the composition for colloidal crystals. When the composition for colloidal crystals does not contain the monomers (C1 to C3), the core-shell particles (A) are selected such that the refractive index of the core (n(core)) satisfies the following formulae (2) and (3). When the composition for colloidal crystals contains the monomer (C1), the core-shell particles (A) are selected such that the refractive index of the core satisfies the following formulae (2) and (5). When the composition for colloidal crystals contains the monomer (C2), the core-shell particles (A) are selected such that the refractive index of the core satisfies the following formulae (2) and (7). When the composition for colloidal crystals contains the monomer (C3), the core-shell particles (A) are selected such that the refractive index of the core satisfies the following formulae (2) and (9). When the composition for colloidal crystals contains two or more of the monomers (C1 to C3), the core-shell particles (A) are selected such that the refractive index of the core satisfies the following formulae (2) and (10).

$$n(\text{shell}) - n(\text{core}) \geq 0.07 \qquad (2)$$

In the formula (2), n(shell) denotes the refractive index of the shell of the core-shell particles (A).

$$n(B) - n(\text{core}) \geq 0.07 \qquad (3)$$

In the formula (3), n(B) denotes the refractive index of the monomer (B1) in the composition for colloidal crystals after curing.

$$n(B+C) - n(\text{core}) \geq 0.07 \qquad (5)$$

In the formula (5), n(B+C) denotes the refractive index of a mixture of the monomer (B1) and the monomer (C1) in the composition for colloidal crystals after curing.

$$n(B+C) - n(\text{core}) \geq 0.07 \qquad (7)$$

In the formula (7), n(B+C) denotes the refractive index of a mixture of the monomer (B1) and the monomer (C2) in the composition for colloidal crystals after curing.

$$n(B+C) - n(\text{core}) \geq 0.07 \qquad (9)$$

In the formula (9), n(B+C) denotes the refractive index of a mixture of the monomer (B1) and the monomer (C3) in the composition for colloidal crystals after curing.

$$n(B+C) - n(\text{core}) \geq 0.07 \qquad (10)$$

In the formula (10), n(B+C) denotes the refractive index of the monomer (B1) and the monomer (C) in the composition for colloidal crystals after curing. The monomer (C) is composed of at least two of the monomer (C1), the monomer (C2), and the monomer (C3).

When the difference of refractive indexes in the formulae (2), (3), (5), (7), (9), and (10) is less than 0.07, the colloidal crystal cured film has decreased peak reflectance and poor optical properties. Although the upper limit of the refractive index difference is not limited, n(shell), n(B), and n(B+C) are approximately 1.6, respectively, and the refractive index of air is 1.00, so that the upper limit of the refractive index difference is substantially approximately 0.6. The refractive index of each component is determined by preparing a cured film of the component by polymerization and curing under the same conditions and measuring the refractive index of the cured film with an Abbe refractometer at 25° C. For example, a cured film is prepared by applying a coating liquid containing a monomer and a photopolymerization initiator to a glass substrate at a thickness of 100 μm, curing the monomer by ultraviolet irradiation at 1000 mJ/cm$^2$, and taking the cured film off the glass substrate.

The core-shell particles may be produced by any one of various known methods. Examples of such methods include the graft polymerization of a monomer on a core containing a polymerization initiator group (method 1; see, for example, WO 2005-108451 and JP2010-18760A), a reaction of a functional group on a core surface with a terminal functional group of a polymer (method 2; see, for example, WO 2003-

100139), and particle synthesis using a macromer to produce a comonomer (method 3). The method 1 is preferred because various monomers can be used for the linear polymer. Furthermore, a graft polymerization on a core containing a living radical polymerization initiator group is preferred because this can form a high-density linear polymer and allows high design flexibility on the molecular weight of the linear polymer.

The core containing a living radical polymerization initiator group may be produced by any known method. For example, the core may be synthesized by reacting a compound containing a reactive functional group, such as a silane coupling group, and a living radical polymerization initiator group with a reactive functional group disposed on a surface of a particle synthesized in advance. The core may also be synthesized by the copolymerization of a monomer containing a living radical polymerization initiator group in the synthesis of an organic polymer particle.

Examples of a method for synthesizing a core by the copolymerization of a monomer containing a living radical polymerization initiator group include, but are not limited to, known polymerization methods, such as a soap-free emulsion polymerization method, an emulsion polymerization method, a feed emulsion polymerization method, a seed emulsion polymerization method, a dispersion polymerization method, a suspension polymerization method, and a precipitation polymerization method. Among these, the soap-free emulsion polymerization method and the seed emulsion polymerization method are preferred because monodisperse particles having a narrow particle size distribution can be easily produced by these methods. The polymerization conditions may be appropriately selected in accordance with the type of monomer and are generally preferably a polymerization temperature in the range of 30° C. to 90° C. for 2 to 48 hours while stirring. The polymerization may involve the use of an emulsifier, a reactive emulsifier, a dispersant, a polymerization initiator, and/or a chain transfer agent.

The monomer containing a living radical polymerization initiator group may be any monomer that has a polymerization initiator group for living radical polymerization and a polymerizable double bond in its molecule. The living radical polymerization can use a living radical polymerization initiator group, for example, nitroxide-mediated polymerization (NMP), atom transfer radical polymerization (ATRP), reversible addition-fragmentation chain-transfer polymerization (RAFT), or organotellurium-mediated living radical polymerization (TERP). Use of NMP is preferred in terms of ease of polymerization control, less odor, and non-use of a heavy metal substance. Examples of the monomer containing a living radical polymerization initiator group include 2-(4'-hydroxy-2',2',6',6'-tetramethyl-1'-piperidinyloxy)-2-(4'-vinylphenyl)ethanol, 2-(4'-hydroxy-2',2',6',6'-tetramethyl-1'-piperidinyloxy)-2-(3'-vinylphenyl)ethanol, 2-(2',2',6',6'-tetramethyl-1'-piperidinyloxy)-2-(4'-vinylphenyl)ethanol, 2-isopropyloxycarbonyloxy-1-(4'-acetoxy-2',2',6',6'-tetramethyl-1'-piperidinyloxy)-1-(4'-vinylphenyl)ethane, 2-(N-t-butyl-N-(2'-methyl-1-phenylpropyl)aminooxy)-2-(4'-vinylphenyl)ethanol, and 2-isopropyloxycarbonyloxy-1-(N-t-butyl-N-(1'-diethylphosphono-2',2'-dimethylpropyl)aminooxy)-1-(4'-vinylphenyl)ethane. These monomers containing a living radical polymerization initiator group may be used alone or in combination.

A shell may be produced by forming a linear polymer by the polymerization of a shell monomer using the living radical polymerization initiator group of the core. In this way, the core-shell particles (A) can be synthesized. The linear polymer may be formed by any known polymerization method, such as a bulk polymerization method, an emulsion polymerization method, a suspension polymerization method, or a solution polymerization method. The polymerization conditions can be appropriately selected in accordance with the decomposition characteristics of the living radical polymerization initiator group, the type of shell monomer, or the desired molecular weight, and are generally preferably a polymerization temperature in the range of 50° C. to 180° C. for 2 to 48 hours. In order to perform polymerization such that a linear polymer uniformly extends from a surface of a core particle, and in order to prevent the aggregation of core particles, if necessary, a living radical polymerization initiator not bonded to the core particle may also be used. For polymerization by NMP, examples of the polymerization initiator include 2-(4'-hydroxy-2',2',6',6'-tetramethyl-1'-piperidinyloxy)-2-phenylethanol, 2-(N-t-butyl-N-(2'-methyl-1-phenylpropyl)aminooxy)-2-phenylethanol, and 2-isopropyloxycarbonyloxy-1-(N-t-butyl-N-(1'-diethylphosphono-2',2'-dimethylpropyl)aminooxy)-1-phenylethane.

<Composition for Colloidal Crystals>

In a composition for colloidal crystals without the monomers (C1 to C3), the core-shell particles (A) constitute 25% to 65% by weight of the composition, and the monomer (B1) constitutes 35% to 75% by weight of the composition. The total of the core-shell particles (A) and the monomer (B1) is 100% by weight. In a composition for colloidal crystals containing one of the monomers (C1 to C3), the core-shell particles (A) constitute 25% to 65% by weight of the composition, and a mixture of the monomer (B1) and one of the monomers (C1 to C3) constitutes 35% to 75% by weight of the composition. The monomer (B1) content is 5% by weight or more of the composition, and the monomer (C1, C2, or C3) content is 70% by weight or less of the composition. The total of the core-shell particles (A), the monomer (B1), and the monomer (C1, C2, or C3) components is 100% by weight. In a composition for colloidal crystals containing two or more of the monomers (C1 to C3), the core-shell particles (A) constitute 25% to 65% by weight of the composition, and a mixture of the monomer (B1) and the monomers (C1 to C3) constitutes 35% to 75% by weight of the composition. The monomer (B1) content is 5% by weight or more of the composition, and the monomer (C1 to C3) content is 70% by weight or less of the composition. The total of the core-shell particles (A), the monomer (B1), and the monomer (C1 to C3) components is 100% by weight. The monomer (C1 to C3) is composed of at least two appropriately selected from the monomer (C1), the monomer (C2), and the monomer (C3).

The core-shell particles (A) constitute 25% to 65% by weight, preferably 30% to 60% by weight, of the composition for colloidal crystals. When the core-shell particles (A) constitute less than 25% by weight, it is not able to reach the concentration at which the core-shell particles (A) are adjacent to one another, and no colloidal crystallization occurs. Even if colloidal crystallization occurs, satisfactory optical properties cannot be achieved because of a low percentage of the core-shell particles (A). On the other hand, when the core-shell particles (A) constitute more than 65% by weight of the composition, cracks or strain occurs in the colloidal crystals because of the high percentage of the core-shell particles (A), resulting in high haze.

The monomer (B1) and the monomer (C1 to C3) constitute 35% to 75% by weight of the composition. The monomer (B1) content is 5% by weight or more. A monomer (B1) content of less than 5% by weight unfavorably tends to result in high haze. The monomer (C1 to C3) content is 70% by weight or less and preferably 0.1% by weight or more. Use of predetermined amounts of monomer (B1) and monomer (C1 to C3) results in a transparent colloidal crystal cured film having high peak reflectance and low haze.

The composition for colloidal crystals preferably contains a polymerization initiator to promote curing. The polymerization initiator may be a known polymerization initiator, such as an azo polymerization initiator, an organic peroxide polymerization initiator, or a photopolymerization initiator. For example, the azo radical polymerization initiator may be azobisisobutyronitrile or azobiscyclohexanecarbonitrile. The organic peroxide polymerization initiator may be benzoyl peroxide, t-butyl hydroperoxide, or dicumyl peroxide. The photopolymerization initiator may be 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-butanone-1,2,4,6-trimethylbenzoyldiphenylphosphine oxide, bis(2,4,6-trimethylbenzoyl)phenyl-phosphine oxide, benzophenone, or isopropylthioxanthone.

The polymerization initiator content is preferably 0.1 to 10 parts by weight, more preferably 0.5 to 5 parts by weight, per 100 parts by weight of the composition for colloidal crystals containing the core-shell particles (A), the monomer (B1), and the monomer (C1 to C3) components. When the polymerization initiator content is more than 10 parts by weight, part of the polymerization initiator not used in the initiation of the polymerization remains in the cured film and may cause deterioration in long-term characteristics and visible light transmittance. On the other hand, when the polymerization initiator content is less than 0.1 parts by weight, a regular arrangement of particles tends to be broken during curing because of insufficient polymerization initiating ability and slow curing reaction, and the resulting cured film tends to have inadequate mechanical strength because of insufficient curing reaction.

The composition for colloidal crystals preferably contains an organic solvent so as to improve the dispersion of the core-shell particles (A), control the viscosity or improve the applicability of the composition for colloidal crystals, and promote the crystallization of the composition for colloidal crystals. The organic solvent is preferably a good solvent for the linear polymer of the shell so as to sufficiently disperse the core-shell particles (A). The organic solvent may be any organic solvent that evaporates at the drying temperature. Examples of such organic solvents include (poly)alkylene glycol monoalkyl ethers, (poly)alkylene glycol monoalkyl ether acetates, ethers, ketones, esters, aromatic hydrocarbons, alcohols, and amides. Specific examples of the organic solvents include (poly)alkylene glycol monoalkyl ethers, such as ethylene glycol monoethyl ether, diethylene glycol monobutyl ether, propylene glycol monomethyl ether, and dipropylene glycol monomethyl ether, (poly)alkylene glycol monoalkyl ether acetates, such as ethylene glycol monomethyl ether acetate, diethylene glycol monobutyl ether acetate, propylene glycol monomethyl ether acetate, propylene glycol monomethyl ether propionate, and dipropylene glycol monoethyl ether acetate, ethers, such as 1,2-dimethoxyethane, dioxane, and diethylene glycol dimethyl ether, ketones, such as methyl ethyl ketone, methyl isobutyl ketone, cyclohexanone, isophorone, and diacetone alcohol, esters, such as n-propyl acetate, n-butyl acetate, 2-ethylhexyl acetate, methoxybutyl acetate, ethyl-3-ethoxypropionate, γ-butyrolactone, and propylene carbonate, aromatic hydrocarbons, such as toluene and xylene, alcohols, such as 2-propanol and cyclohexanol, and amides, such as N,N-dimethylformamide and N-methylpyrrolidone. The organic solvents may be used alone or in combination.

The organic solvent content is 5 to 500 parts by weight, preferably 7 to 300 parts by weight, more preferably 10 to 200 parts by weight, per 100 parts by weight of the composition for colloidal crystals containing the core-shell particles (A), the monomer (B1), and the monomer (C1 to C3) components. An organic solvent content of less than 5 parts by weight results in small effects of viscosity control or applicability improvement and rare occurrence of colloidal crystallization. An organic solvent content of more than 500 parts by weight results in a reduced film thickness after drying and poor optical properties. Furthermore, an excessive increase in the amount of organic solvent to be used is industrially unfavorable because of economical disadvantages and increased drying time.

In addition to the components described above, a monomer having a functional group that is generally used to improve the adhesion between a cured film and a substrate can be appropriately added to the composition for colloidal crystals. Examples of the functional group include an alkoxysilyl group, a carboxy group, a hydroxy group, a phosphate group, an epoxy group, an isocyanate group, and a heterocyclic group. For example, a monomer having an alkoxysilyl group may be 3-(meth)acryloxypropyltrimethoxysilane, a monomer having a carboxy group may be 2-(meth)acryloyloxyethyl succinic acid or 2-(meth)acryloyloxyethyl phthalic acid, a monomer having a hydroxy group may be 2-hydroxy-3-phenoxypropyl(meth)acrylate, a monomer having a phosphate group may be phosphoric acid 2-((meth)acryloyloxy)ethyl, a monomer having an epoxy group may be 4-hydroxybutyl(meth)acrylate glycidyl ether, a monomer having an isocyanate group may be 2-(meth)acryloyloxyethyl isocyanate, and a monomer having a heterocyclic group may be tetrahydrofurfuryl(meth)acrylate or (meth)acryloyl-morpholine. 10 parts by weight or less, preferably 5 parts by weight or less, of a monomer having such a functional group per 100 parts by weight of the composition for colloidal crystals is generally blended to improve characteristics. When the amount of monomer having a functional group is more than 10 parts by weight, the resulting colloidal crystal cured film unfavorably has poor optical properties.

In addition to the components described above, in order to improve the curing rate or mechanical strength, a generally used polyfunctional monomer having three or more polymerizable groups may be appropriately added. Specific examples include trimethylolpropane triacrylate, pentaerythritol triacrylate, pentaerythritol tetraacrylate, dipentaerythritol monohydroxy pentaacrylate, and dipentaerythritol hexaacrylate. Ten parts by weight or less, preferably five parts by weight or less, of such a polyfunctional monomer per 100 parts by weight of the composition for colloidal crystals is generally blended to improve characteristics. A polyfunctional monomer content of more than 10 parts by weight unfavorably results in poor optical properties of the colloidal crystal cured film.

In addition to the components described above, an ultraviolet absorber, an infrared absorber, a light stabilizer, an antioxidant, a leveling agent, a surface conditioner, a thickener, an antifoaming agent, a dye, a pigment, and/or a metal oxide generally used in the paint industry can be appropriately added to the composition for colloidal crystals. In general, it is preferable to add 5 parts by weight or less of these additive agents per 100 parts by weight of the composition for colloidal crystals.

<Colloidal Crystal Cured Film>

A colloidal crystal cured film is manufactured by crystallizing a composition for colloidal crystals and curing the monomer (B1) and the monomer (C1 to C3) of the composition for colloidal crystals using heat or light. The colloidal crystal cured film has increased mechanical strength while retaining a regular arrangement of core-shell particles (A) even after curing. Whether a three-dimensional regular arrangement of core-shell particles (A) is maintained in the colloidal crystal cured film after curing may be determined by a method for identifying a reflection peak on reflection and transmission spectra or, in the case of a reflection peak in the visible light region, a method for visually identifying the reflection peak as a structural color. The desired optical properties of a colloidal crystal cured film depend on the application of the colloidal crystal cured film. For coloring material applications, in order to visually recognize a bright structural color, the reflectance at a reflection peak in reflectance measurement is preferably 50% or more. The cured film preferably has a haze of 10% or less. A haze of more than 10% results in the visual recognition of the cured film as a cloudy film, low transparency, and deterioration in visual effects of a bright structural color. The reflectance at a reflection peak may be increased by increasing the film thickness and the number of colloidal crystal particle layers. However, it is obvious that this also increases the haze. The term "cured film", as used herein, refers to a film manufactured by the polymerization of a monomer in a composition while the composition assumes a film form. Thus, curing in the present disclosure includes not only curing through the formation of a cross-linked structure from a composition containing a monomer having two double bonds but also curing through the polymerization of a monomer having one double bond.

The colloidal crystal cured film preferably has a thickness in the range of 1 to 100 µm, more preferably 3 to 50 µm. A film thickness of less than 1 µm results in reduced peak reflectance of the resulting colloidal crystal cured film and poor optical properties. On the other hand, a film thickness of more than 100 µm tends to result in the occurrence of cracks or strain and high haze.

<Method for Manufacturing Colloidal Crystal Cured Film>

A colloidal crystal cured film can be manufactured through the following two processes a) and b):

a) a crystallization process for applying a composition for colloidal crystals containing core-shell particles (A), a monomer (B1), a monomer (C1 to C3), an organic solvent, and optionally a polymerization initiator to a substrate and evaporating the organic solvent to form colloidal crystals; and b) a curing process for curing the crystallization composition prepared in the process a) using an active energy beam or heat.

In the crystallization process a), the composition for colloidal crystals may be applied by one of various methods, such as a spin coating method, a bar coating method, a spray coating method, a dip coating method, a flow coating method, a slit coating method, a gravure coating method, and a screen printing method. The substrate to which the composition for colloidal crystals is to be applied may be a substrate, such as a glass or plastic film, or a three-dimensional formed product. The shape of the substrate is not particularly limited.

The drying temperature for the evaporation of the organic solvent is preferably in the range of 10° C. to 250° C., more preferably 20° C. to 200° C., still more preferably 25° C. to 150° C. A drying temperature of less than 10° C. tends to result in high viscosity of the monomers (B1) and (C1 to C3) and rare occurrence of colloidal crystallization. On the other hand, a drying temperature of more than 250° C. results in the evaporation of the monomer (B1) and the monomer (C1 to C3).

The drying time is preferably 1 to 800 minutes, more preferably 3 to 300 minutes, still more preferably 5 to 200 minutes. A drying time of less than 1 minute results in rare occurrence of colloidal crystallization. On the other hand, a drying time of more than 800 minutes results in unfavorably low productivity because of the very long drying time. Although the evaporation of the organic solvent promotes the crystallization of colloidal crystals, some organic solvent may remain after drying without problems.

Whether colloidal crystals are formed or not may be determined by a method for identifying a reflection peak on reflection and transmission spectra or, in the case of a reflection peak in the visible light region, a method for visually identifying the reflection peak as a structural color.

In the curing process b), the polymerization of the monomer (B1) and the monomer (C1 to C3) by heating or active energy beam irradiation, such as ultraviolet, electron beam, or radioactive irradiation, can cure the crystallized composition to form a colloidal crystal cured film. Among these, ultraviolet irradiation can promote curing while maintaining the regular arrangement of the core-shell particles (A). Examples of the light source for ultraviolet irradiation include low-pressure mercury lamps, high-pressure mercury lamps, ultrahigh-pressure mercury lamps, carbon arc lamps, xenon lamps, and metal halide lamps. In addition to ultraviolet irradiation, heating may also be applied to promote curing. The heating temperature is generally in the range of 10° C. to 150° C., preferably 20° C. to 120° C.

EXAMPLES

The embodiments described above will be further described in the following examples and comparative examples. The average particle size, CV, reflectance, haze, and refractive index in the examples were measured by the following methods.

1) Average Particle Size (nm) and CV (%)

The average particle size and CV of the core and the core-shell particle were measured by dynamic light scattering using a light scattering photometer ELS-8000 [manufactured by Otsuka Electronics Co., Ltd.]. Ion-exchanged water was used as a dispersion medium in the measurement of the core. Tetrahydrofuran (THF) was used as a dispersion medium in the measurement of the core-shell particle.

2) Reflection Wavelength (nm) and Reflectance (%)

Measurement was performed with an ultraviolet-visible spectrophotometer V-560 [manufactured by JASCO Corp.] equipped with an integrating sphere apparatus. Barium sulfate was used as a standard reflector. The spectral reflectance spectrum of a colloidal crystal cured film was measured in the range of 350 to 850 nm to read the wavelength (nm) and reflectance (%) of a reflection peak.

3) Haze (%)

A haze meter NDH 5000 [manufactured by Nippon Denshoku Industries Co., Ltd.] was used to measure the haze (%) of a colloidal crystal cured film.

4) Refractive Index

A film of each component was prepared. The refractive index of the film was measured at 25° C. with an Abbe refractometer [manufactured by Atago Co., Ltd.]. The refractive indexes of the core and the shell were measured by applying a coating liquid containing a core or shell monomer and a polymerization initiator 2,2'-azobis(2,4-dimethylvaleronitrile) to a glass substrate at a thickness of 100 μm, heating the coating liquid at 65° C. for 5 hours and at 85° C. for 2 hours to form a film, and taking the film off the glass substrate. The refractive indexes of the monomer (B1) and a mixture of the monomer (B1) and the monomer (C1 to C3) after curing were measured by applying a coating liquid containing the monomer or the mixture and a photopolymerization initiator bis(2,4,6-trimethylbenzoyl)phenyl-phosphine oxide (Irgacure 819 [manufactured by Ciba Specialty Chemicals Co., Ltd.]) to a glass substrate at a thickness of 100 μm, curing the monomer or the mixture by 1000 mJ/cm$^2$ of ultraviolet irradiation to form a film, and taking the film off the glass substrate.

5) Film Thickness

An optical thin-film measuring apparatus F20-EXR [manufactured by Filmetrics, Inc.] was used to measure the thickness of a colloidal crystal cured film.

Example 1-1

Synthesis of Core (Core D)

A core was synthesized by two-stage seed emulsion polymerization. At the first stage, a 500-mL four-neck flask equipped with a condenser tube, a thermometer, an agitator, and a nitrogen inlet was charged with 0.146 g of a reactive emulsifier sodium styrenesulfonate (NaSS) and 350 g of ion-exchanged water. 13.72 g of a monomer methyl methacrylate (MMA) and 0.730 g of a cross-linking monomer ethylene glycol dimethacrylate (EGDM) were added to the flask, were mixed in a nitrogen stream, and were heated to 65° C. 0.0292 g of a polymerization initiator potassium persulfate (KPS) was then added to the reaction solution. After polymerization reaction at 65° C. for 5 hours, the reaction solution was cooled to room temperature.

At the second stage, 0.219 g of an emulsifier sodium dodecylbenzenesulfonate (DBS) was added to the reaction solution and was mixed at room temperature in a nitrogen stream. 0.730 g of a m/p mixture of 2-(4'-hydroxy-2',2',6',6'-tetramethyl-1'-piperidinyloxy)-2-(3'-vinylphenyl)ethanol and 2-(4'-hydroxy-2',2',6',6'-tetramethyl-1'-piperidinyloxy)-2-(4'-vinylphenyl)ethanol (a compound 1 described below, m/p ratio=57/43) as a monomer containing a living radical polymerization initiator group and 0.146 g of a polymerization initiator 2,2'-azobis(2,4-dimethylvaleronitrile) (ADVN) were dissolved in 8.03 g of a monomer MMA and 5.84 g of a cross-linking monomer EGDM. This mixed solution was gradually added to the reaction solution and was mixed at room temperature for 3 hours. The reaction solution was then heated to 65° C. After polymerization reaction at 65° C. for 5 hours and at 85° C. for 2 hours, the reaction solution was cooled to room temperature. A particle dispersion was prepared by filtering off an aggregate with a nylon mesh. Particles were removed with a centrifuge, were washed with water and methanol, and were dried under vacuum to yield a core D. The average particle size was 204 nm, CV was 9%, and the refractive index of the core (n(core))) was 1.50.

[Chem. 16]

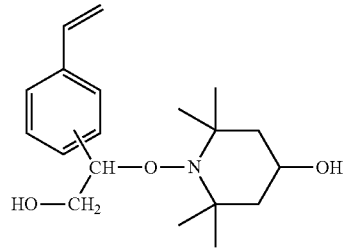

Compound 1

<Synthesis Of Core-Shell Particles>

(Core-Shell Particle Dc)

5.54 g of styrene (St) and 0.0781 g of 2-(4'-hydroxy-2',2',6',6'-tetramethyl-1'-piperidinyloxy)-2-phenylethanol (a compound 2 described below) were dissolved in 4.08 g of N,N-dimethylformamide (DMF). 1.70 g of the core D was added to the solution and was mixed in a homogenizer for 30 minutes to disperse the core D. The dispersion liquid was poured into a 20-mL glass ampule, which was then purged with nitrogen and was sealed. Polymerization was performed at 115° C. for 15 hours. THF was added to the contents, and particles were separated with a centrifuge. The particles were washed twice with THF and were dried under vacuum to yield core-shell particles Dc. The graft ratio was 39%, the average particle size was 236 nm, CV was 15%, and the refractive index of the shell (n(shell)) was 1.59.

[Chem. 17]

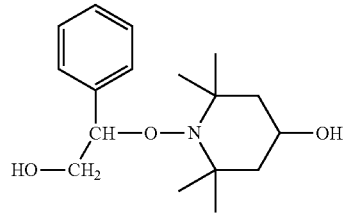

Compound 2

<Manufacture of Composition for Colloidal Crystals and Colloidal Crystal Cured Film>

1.00 g of the core-shell particles Dc, 1.50 g of the monomer (B1) 2-phenylphenoxyethyl acrylate (BPEA, see the chemical formula described below) (NK ester A-LEN-10 [manufactured by Shin Nakamura Chemical Co., Ltd.]), 0.75 g of an organic solvent diethylene glycol monobutyl ether acetate (DGBA), 0.75 g of an organic solvent ethylene glycol monomethyl ether acetate (EGMA), and 0.045 g of a photopolymerization initiator bis(2,4,6-trimethylbenzoyl)phenyl-phosphine oxide (Irgacure 819 [manufactured by Ciba Specialty Chemicals Co., Ltd.]) were mixed in a homogenizer for 60 minutes to disperse the core-shell particles, yielding a composition for colloidal crystals.

The composition was applied to a glass substrate with a bar coater (#26). The organic solvents were evaporated at 90° C. for 120 minutes to crystallize the core-shell particles.

The colloidal crystals were then irradiated with ultraviolet light of a high-pressure mercury lamp (ultraviolet irradiation apparatus Toscure 401 [manufactured by Harison Toshiba Lighting Corp.]) to cure the monomer (B1), yielding a colloidal crystal cured film (film thickness: 25 μm). The colloidal crystal cured film had a reflection peak at 599 nm, and the reflectance at the reflection peak was 57%. The haze was 3.9%.

[Chem. 18]

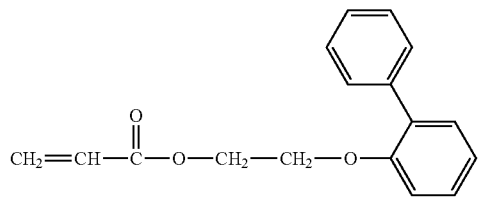

BPEA

Examples 1-2 to 5-3 and Comparative Examples 1 to 5

Cores E to O

In the same manner as the core D, the cores E to O were synthesized using the amount of usage listed in Table 1. Table 1 shows the results.

The symbols in the following Tables 1 to 9 are as follows:
EMA: ethyl methacrylate
tBA: tert-butyl acrylate
tBMA: tert-butyl methacrylate
BDMA: 1,4-butanediol dimethacrylate
TFEMA: 2,2,2-trifluoroethyl methacrylate
St: styrene
BzMA: benzyl methacrylate
DVB: divinylbenzene (purity 55%, containing ethylvinylbenzene 45%)
HS-10: Aqualon HS-10 [manufactured by Dai-ichi Kogyo Seiyaku Co., Ltd.]
BPEA: 2-phenylphenoxyethyl acrylate (NK ester A-LEN-10 [manufactured by Shin Nakamura Chemical Co., Ltd.]) (see the following chemical formula)

[Chem. 19]

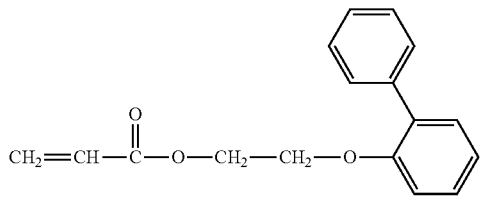

BPEA

BPA: 2-phenylphenyl acrylate (ARONIX TO-2344 [manufactured by Toagosei Co., Ltd.]) (see the following chemical formula)

[Chem. 20]

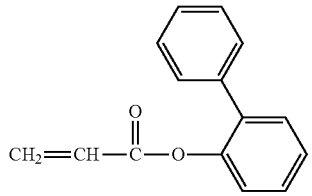

BPA

BPM: 2-phenylphenyl methacrylate (see the following chemical formula)

[Chem. 21]

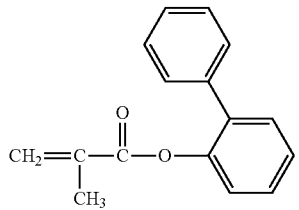

BPM

LA: lauryl acrylate

PSDA: bis(4-acryloxyethoxyphenyl)sulfide (ARONIX TO-2066 [manufactured by Toagosei Co., Ltd.]) (see the following chemical formula)

[Chem. 22]

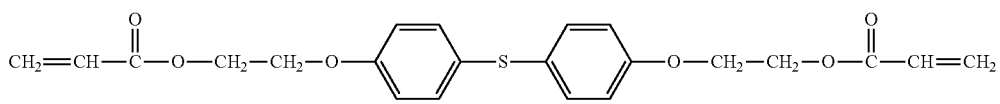

PSDA

MPSM: bis(4-methacryloylthiophenyl)sulfide (see the following chemical formula)

[Chem. 23]

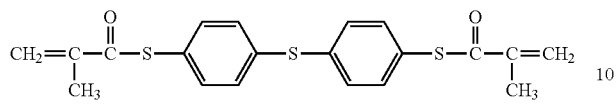

MPSM

PGMA: propylene glycol methyl ether acetate
FL1A: 9,9-bis[4-(2-acryloyloxyethoxy)phenyl]fluorene (see the following chemical formula)

[Chem. 24]

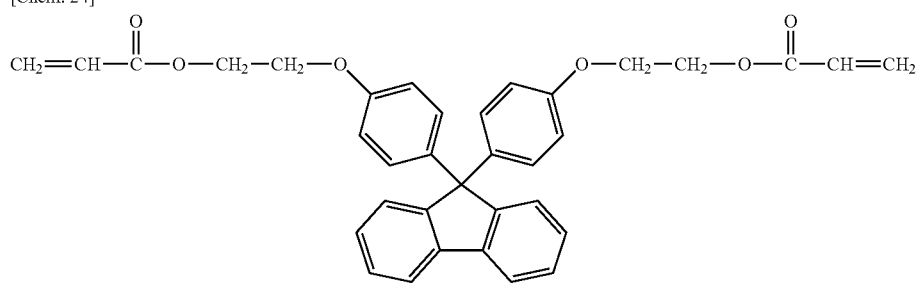

FL1A

FL2A: 9,9-bis[4-(2-(2-acryloyloxyethoxy)ethoxy)phenyl]fluorene (see the following chemical formula)

[Chem. 25]

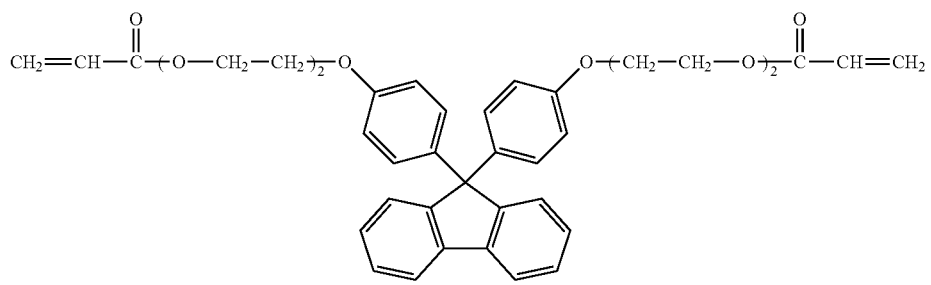

FL2A

FL1M: 9,9-bis[4-(2-methacryloyloxyethoxy)phenyl]fluorene (see the following chemical formula)

[Chem. 26]

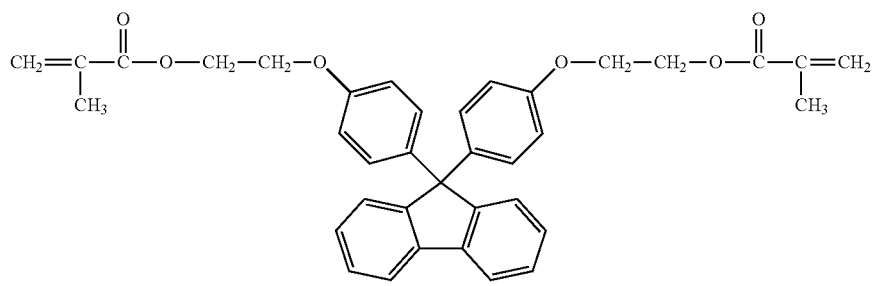

FL1M

NPAC: n-propyl acetate
BA2A: 2,2-bis[4-(2-(2-acryloyloxyethoxy)ethoxy)phenyl]propane (see the following chemical formula)

[Chem. 27]

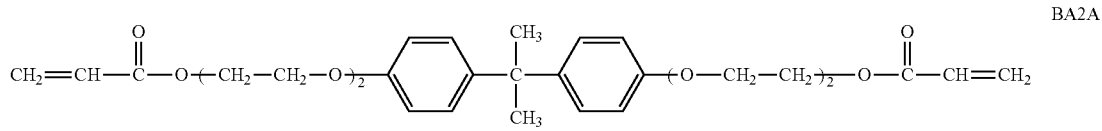

BA1A: 2,2-bis[4-(2-acryloyloxyethoxy)phenyl]propane (see the following chemical formula)

[Chem. 28]

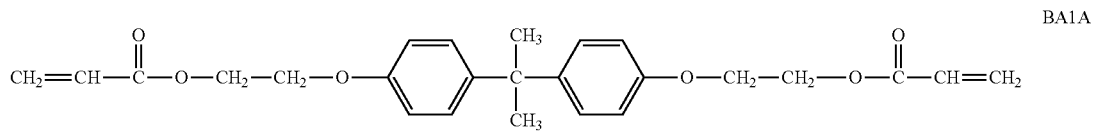

BA1M: 2,2-bis[4-(2-methacryloyloxyethoxy)phenyl]propane (see the following chemical formula)

[Chem. 29]

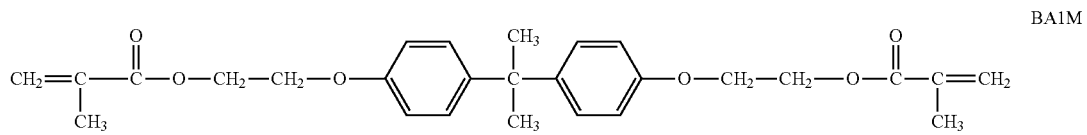

MyA: myristyl acrylate
NDA: 1,9-nonanediol diacrylate
DGDM: diethylene glycol dimethacrylate
PETA: pentaerythritol triacrylate

TABLE 1

| | Core | D | E | F | G | H | I |
|---|---|---|---|---|---|---|---|
| Usage at first stage (g) | Monomer | MMA 13.72 | EMA 13.78 | EMA 9.93 | EMA 9.92 | EMA 9.92 | tBMA 13.85 |
| | | — | — | tBA 4.38 | tBA 4.38 | tBA 4.38 | — |
| | Cross-linking monomer | EGDM 0.730 | EGDM 0.730 | EGDM 0.292 | EGDM 0.292 | EGDM 0.292 | BDMA 0.730 |
| | Reactive emulsifier | NaSS 0.146 | NaSS 0.0876 | HS-10 0.0015 | HS-10 0.0058 | NaSS 0.0292 | NaSS 0.0146 |
| | KPS | 0.0292 | 0.0292 | 0.0438 | 0.0438 | 0.0438 | 0.0292 |
| | Ion-exchanged water | 350 | 350 | 350 | 350 | 350 | 350 |
| Usage at second stage (g) | Monomer | MMA 8.03 | EMA 8.03 | EMA 3.65 | EMA 3.65 | EMA 3.65 | tBMA 8.03 |
| | | — | — | tBA 4.38 | tBA 4.38 | tBA 4.38 | — |
| | Cross-linking monomer | EGDM 5.84 | EGDM 5.84 | EGDM 5.84 | EGDM 5.84 | EGDM 5.84 | BDMA 5.84 |
| | Compound 1 | 0.730 | 0.730 | 0.730 | 0.730 | 0.730 | 0.730 |
| | DBS | 0.219 | 0.219 | 0.219 | 0.219 | 0.219 | 0.219 |
| | ADVN | 0.146 | 0.146 | 0.146 | 0.146 | 0.146 | 0.146 |
| Physical properties of core | Average particle size (nm) | 204 | 180 | 187 | 130 | 265 | 174 |
| | CV (%) | 9 | 8 | 10 | 8 | 9 | 13 |
| | n (core) | 1.50 | 1.49 | 1.48 | 1.48 | 1.48 | 1.47 |

TABLE 1-continued

| Core | | J | K | L | M | N | O |
|---|---|---|---|---|---|---|---|
| Usage at first stage (g) | Monomer | MMA 9.39 | MA 9.39 | TFEMA 14.40 | EMA 9.93 | St 10.22 | BzMA 13.78 |
| | | TFEMA 4.38 | TFEMA 4.38 | — | tBA 4.38 | — | — |
| | Cross-linking monomer | EGDM 0.730 | EGDM 0.730 | EGDM 0.146 | EGDM 0.292 | DVB 0.541 | EGDM 0.730 |
| | Reactive emulsifier | NaSS 0.102 | NaSS 0.102 | NaSS 0.0584 | HS-10 0.0029 | NaSS 0.0649 | NaSS 0.0876 |
| | KPS | 0.0292 | 0.0292 | 0.0292 | 0.0438 | 0.0108 | 0.0292 |
| | Ion-exchanged water | 350 | 350 | 350 | 350 | 350 | 350 |
| Usage at second stage (g) | Monomer | MMA 3.65 | MMA 2.19 | TFEMA 10.22 | EMA 3.65 | — | EMA 8.03 |
| | | TFEMA 4.38 | TFEMA 4.38 | — | tBA 4.38 | — | — |
| | Cross-linking monomer | EGDM 5.84 | EGDM 5.84 | EGDM 4.08 | EGDM 5.84 | DVB 10.28 | EGDM 5.84 |
| | Compound 1 | 0.730 | 2.190 | 0.292 | 0.730 | 0.541 | 0.730 |
| | DBS | 0.219 | 0.219 | 0.219 | 0.219 | 0.541 | 0.219 |
| | ADVN | 0.146 | 0.146 | 0.146 | 0.146 | 0.108 | 0.146 |
| Physical properties of core | Average particle size (nm) | 194 | 201 | 149 | 160 | 189 | 180 |
| | CV (%) | 12 | 14 | 15 | 9 | 12 | 13 |
| | n (core) | 1.47 | 1.47 | 1.43 | 1.48 | 1.60 | 1.56 |

(Core-Shell Particles Ec to Oe)

In the same manner as the core-shell particle Dc, the core-shell particles Ec to Oe were synthesized using the amount of usage listed in Table 2. Table 2 shows the results.

TABLE 2

| Core-shell particle (A) | | Dc | Ec | Fc | Fd | Fe | Ge | Hf |
|---|---|---|---|---|---|---|---|---|
| Usage (g) | Monomer | St 5.54 | St 5.54 | St 5.54 | St 4.99 | St 3.88 | St 3.88 | St 4.99 |
| | | — | — | — | BPEA 1.43 | BPEA 4.28 | BPEA 4.28 | BPM 1.27 |
| | Core | 1.70 | 1.70 | 1.70 | 1.70 | 1.70 | 1.70 | 1.70 |
| | Compound 2 | 0.0781 | 0.0781 | 0.0781 | 0.0781 | 0.0781 | 0.0781 | 0.0781 |
| | DMF | 4.08 | 4.08 | 4.08 | 4.08 | 4.08 | 4.08 | 4.08 |
| Core | Symbol | D | E | F | F | F | G | H |
| | n (core) | 1.50 | 1.49 | 1.48 | 1.48 | 1.48 | 1.48 | 1.48 |
| Shell | Symbol | c | c | c | d | e | e | f |
| | Monomer | St | St | St | St/BPEA | St/BPEA | St/BPEA | St/BPM |
| | Composition (wt %) | 100 | 100 | 100 | 78/22 | 48/52 | 48/52 | 80/20 |
| | n (shell) | 1.59 | 1.59 | 1.59 | 1.59 | 1.60 | 1.60 | 1.59 |
| | n (shell) − n (core) | 0.09 | 0.10 | 0.11 | 0.11 | 0.12 | 0.12 | 0.11 |
| Physical properties of core-shell particle (A) | Graft ratio (%) | 39 | 29 | 36 | 39 | 45 | 20 | 34 |
| | Average particle size (nm) | 236 | 223 | 230 | 240 | 241 | 175 | 301 |
| | CV (%) | 16 | 18 | 14 | 16 | 18 | 12 | 12 |

| Core-shell particle (A) | | Ig | Je | Kh | Ll | Me | Nj | Oe |
|---|---|---|---|---|---|---|---|---|
| Usage (g) | Monomer | — | St 3.88 | St 3.88 | — | St 50.2 | LA 9.59 | St 3.88 |
| | | BPEA 10.71 | BPEA 4.28 | BPA 3.58 | BPA 8.95 | BPEA 55.4 | — | BPEA 4.28 |
| | Core | 1.70 | 1.70 | 1.70 | 1.70 | 22.0 | 1.70 | 1.70 |
| | Compound 2 | 0.0781 | 0.0781 | 0.0781 | 0.0781 | 1.01 | 0.0781 | 0.0781 |
| | DMF | 4.08 | 4.08 | 4.08 | 4.08 | 52.8 | 4.08 | 4.08 |
| Core | Symbol | I | J | K | L | M | N | O |
| | n (core) | 1.47 | 1.47 | 1.47 | 1.43 | 1.48 | 1.60 | 1.56 |
| Shell | Symbol | g | e | h | l | e | j | e |
| | Monomer | BPEA | St/BPEA | St/BPA | BPA | St/BPEA | LA | St/BPEA |
| | Composition (wt %) | 100 | 48/52 | 52/48 | 100 | 48/52 | 100 | 48/52 |
| | n (shell) | 1.61 | 1.60 | 1.60 | 1.62 | 1.60 | 1.48 | 1.60 |
| | n (shell) − n (core) | 0.14 | 0.13 | 0.13 | 0.19 | 0.12 | −0.12 | 0.04 |
| Physical properties of core-shell particle (A) | Graft ratio (%) | 8 | 18 | 93 | 11 | 51 | 14 | 38 |
| | Average particle size (nm) | 203 | 213 | 227 | 220 | 228 | 230 | 220 |
| | CV (%) | 15 | 20 | 18 | 19 | 16 | 15 | 18 |

In the same manner as in Example 1-1, compositions for colloidal crystals and colloidal crystal cured films were manufactured using the amount of usage and drying conditions listed in Tables 3 to 8. Tables 3 to 8 show the results.

TABLE 3

| | | Example 1-1 | Example 1-2 | Example 1-3 | Example 1-4 | Example 1-5 | Example 1-6 | Example 1-7 |
|---|---|---|---|---|---|---|---|---|
| Composition | Core-shell particle (A) | Dc | Fe | Je | Me | Me | Me | Me |
| | Monomer (B1) | BPEA | BPEA | BPEA | BPEA | BPEA | BPA | BPM |
| Content (wt %) | Core-shell particle (A) | 40 | 30 | 40 | 50 | 60 | 40 | 40 |
| | Monomer (B1) | 60 | 70 | 60 | 50 | 40 | 60 | 60 |
| Usage (g) | Core-shell particle (A) | 1.00 | 1.00 | 1.00 | 1.25 | 1.500 | 1.00 | 1.00 |
| | Monomer (B1) | 1.50 | 2.33 | 1.50 | 1.25 | 1.000 | 1.50 | 1.50 |
| | Organic solvent DGBA | 0.75 | 1.00 | 0.75 | 0.75 | 0.750 | — | — |
| | Organic solvent EGMA | 0.75 | 1.00 | 0.75 | 0.75 | 0.750 | 1.50 | 1.50 |
| | Irgacure 819 | 0.045 | 0.070 | 0.045 | 0.038 | 0.030 | 0.045 | 0.045 |
| Drying | Temperature (° C.) | 90 | 90 | 90 | 90 | 90 | 60 | 60 |
| | Time (min) | 120 | 120 | 120 | 120 | 120 | 120 | 120 |
| Refractive index | n (core) | 1.50 | 1.48 | 1.47 | 1.48 | 1.48 | 1.48 | 1.48 |
| | n (shell) | 1.59 | 1.60 | 1.60 | 1.60 | 1.60 | 1.60 | 1.60 |
| | n (B) | 1.61 | 1.61 | 1.61 | 1.61 | 1.61 | 1.62 | 1.62 |
| Refractive index difference | n (shell) − n (core) | 0.09 | 0.12 | 0.13 | 0.12 | 0.12 | 0.12 | 0.12 |
| | n (B) − n (core) | 0.11 | 0.13 | 0.14 | 0.13 | 0.13 | 0.14 | 0.14 |
| Colloidal crystal cured film | Film thickness (μm) | 25 | 25 | 26 | 25 | 25 | 24 | 25 |
| | Reflection wavelength (nm) | 599 | 670 | 588 | 482 | 449 | 525 | 524 |
| | Reflectance (%) | 57 | 81 | 73 | 70 | 62 | 75 | 71 |
| | Haze (%) | 3.9 | 3.0 | 4.5 | 6.1 | 9.5 | 5.2 | 5.5 |

TABLE 4

| | | Example 2-1 | Example 2-2 | Example 2-3 | Example 2-4 | Example 2-5 | Example 2-6 |
|---|---|---|---|---|---|---|---|
| Composition | Core-shell particle (A) | Dc | Ec | Fc | Fd | Fe | Ge |
| | Monomer (B1) | BPEA | BPEA | BPEA | BPEA | BPEA | BPEA |
| | Monomer (C1) | PSDA | PSDA | PSDA | PSDA | PSDA | PSDA |
| Content (wt %) | Core-shell particle (A) | 40 | 40 | 40 | 40 | 40 | 40 |
| | Monomer (B1) | 30 | 30 | 30 | 30 | 30 | 30 |
| | Monomer (C1) | 30 | 30 | 30 | 30 | 30 | 30 |
| Usage (g) | Core-shell particle (A) | 1.00 | 1.00 | 1.00 | 1.00 | 1.00 | 1.00 |
| | Monomer (B1) | 0.75 | 0.75 | 0.75 | 0.75 | 0.75 | 0.75 |
| | Monomer (C1) | 0.75 | 0.75 | 0.75 | 0.75 | 0.75 | 0.75 |
| | Organic solvent DGBA | 0.75 | 0.75 | 0.75 | 0.75 | 0.75 | 0.75 |
| | Organic solvent EGMA | 0.75 | 0.75 | 0.75 | 0.75 | 0.75 | 0.75 |
| | Irgacure 819 | 0.045 | 0.045 | 0.045 | 0.045 | 0.045 | 0.045 |
| Drying | Temperature (° C.) | 90 | 90 | 90 | 90 | 90 | 90 |
| | Time (min) | 120 | 120 | 120 | 120 | 120 | 120 |
| Refractive index | n (core) | 1.50 | 1.49 | 1.48 | 1.48 | 1.48 | 1.48 |
| | n (shell) | 1.59 | 1.59 | 1.59 | 1.59 | 1.60 | 1.60 |
| | n (B + C) | 1.61 | 1.61 | 1.61 | 1.61 | 1.61 | 1.61 |
| Refractive index difference | n (shell) − n (core) | 0.09 | 0.10 | 0.11 | 0.11 | 0.12 | 0.12 |
| | n (B + C) − n (core) | 0.11 | 0.12 | 0.13 | 0.13 | 0.13 | 0.13 |
| Colloidal crystal cured film | Film thickness (μm) | 26 | 27 | 24 | 24 | 27 | 29 |
| | Reflection wavelength (nm) | 601 | 584 | 596 | 604 | 608 | 422 |
| | Reflectance (%) | 52 | 63 | 67 | 70 | 79 | 82 |
| | Haze (%) | 2.8 | 3.1 | 3.5 | 3.0 | 2.9 | 1.5 |

| | | Example 2-7 | Example 2-8 | Example 2-9 | Example 2-10 | Example 2-11 |
|---|---|---|---|---|---|---|
| Composition | Core-shell particle (A) | Hf | Ig | Je | Kh | Ll |
| | Monomer (B1) | BPEA | BPEA | BPEA | BPEA | BPEA |
| | Monomer (C1) | PSDA | PSDA | PSDA | PSDA | PSDA |
| Content (wt %) | Core-shell particle (A) | 40 | 40 | 40 | 40 | 40 |
| | Monomer (B1) | 30 | 30 | 30 | 30 | 30 |
| | Monomer (C1) | 30 | 30 | 30 | 30 | 30 |
| Usage (g) | Core-shell particle (A) | 1.00 | 1.00 | 1.00 | 1.00 | 1.00 |
| | Monomer (B1) | 0.75 | 0.75 | 0.75 | 0.75 | 0.75 |
| | Monomer (C1) | 0.75 | 0.75 | 0.75 | 0.75 | 0.75 |
| | Organic solvent DGBA | 0.75 | 0.75 | 0.75 | 0.75 | 0.75 |
| | Organic solvent EGMA | 0.75 | 0.75 | 0.75 | 0.75 | 0.75 |
| | Irgacure 819 | 0.045 | 0.045 | 0.045 | 0.045 | 0.045 |
| Drying | Temperature (° C.) | 90 | 90 | 90 | 90 | 90 |
| | Time (min) | 120 | 120 | 120 | 120 | 120 |
| Refractive index | n (core) | 1.48 | 1.47 | 1.47 | 1.47 | 1.43 |
| | n (shell) | 1.59 | 1.61 | 1.60 | 1.60 | 1.62 |
| | n (B + C) | 1.61 | 1.61 | 1.61 | 1.61 | 1.61 |

TABLE 4-continued

|  |  |  |  |  |  |  |
|---|---|---|---|---|---|---|
| Refractive index difference | n (shell) − n (core) | 0.11 | 0.14 | 0.13 | 0.13 | 0.19 |
|  | n (B + C) − n (core) | 0.13 | 0.14 | 0.14 | 0.14 | 0.18 |
| Colloidal crystal cured film | Film thickness (μm) | 26 | 24 | 27 | 28 | 24 |
|  | Reflection wavelength (nm) | 858 | 535 | 586 | 590 | 580 |
|  | Reflectance (%) | 60 | 65 | 88 | 70 | 87 |
|  | Haze (%) | 8.0 | 4.9 | 3.8 | 5.5 | 8.9 |

TABLE 5

|  |  | Example 2-12 | Example 2-13 | Example 2-14 | Example 2-15 | Example 2-16 | Example 2-17 | Example 2-18 | Example 2-19 |
|---|---|---|---|---|---|---|---|---|---|
| Composition |  Core-shell particle (A) | Fe | Fe | Fe | Je | Je | Je | Je | Je |
|  | Monomer (B1) | BPEA | BPA | BPM | BPEA | BPEA | BPEA | BPEA | BPEA |
|  | Monomer (C1) | PSDA | PSDA | PSDA | PSDA | PSDA | PSDA | MPSM | MPSM |
| Content (wt %) | Core-shell particle (A) | 60 | 40 | 40 | 40 | 40 | 40 | 40 | 30 |
|  | Monomer (B1) | 20 | 30 | 30 | 54 | 18 | 5 | 30 | 5 |
|  | Monomer (C1) | 20 | 30 | 30 | 6 | 42 | 55 | 30 | 65 |
| Usage (g) | Core-shell particle (A) | 1.00 | 1.00 | 1.00 | 1.00 | 1.00 | 1.00 | 1.00 | 1.00 |
|  | Monomer (B1) | 0.33 | 0.75 | 0.75 | 1.35 | 0.45 | 0.13 | 0.75 | 0.17 |
|  | Monomer (C1) | 0.33 | 0.75 | 0.75 | 0.15 | 1.05 | 1.38 | 0.75 | 2.17 |
|  | Organic solvent DGBA | 0.50 | — | — | 0.75 | 0.75 | 0.75 | 1.50 | 2.00 |
|  | EGMA | 0.50 | 1.50 | 1.50 | 0.75 | 0.72 | 0.75 | — | — |
|  | Irgacure 819 | 0.020 | 0.045 | 0.045 | 0.045 | 0.045 | 0.045 | 0.045 | 0.070 |
| Drying | Temperature (° C.) | 90 | 60 | 60 | 90 | 90 | 90 | 110 | 110 |
|  | Time (min) | 120 | 120 | 120 | 120 | 120 | 120 | 120 | 120 |
| Refractive index | n (core) | 1.48 | 1.48 | 1.48 | 1.47 | 1.47 | 1.47 | 1.47 | 1.47 |
|  | n (shell) | 1.60 | 1.60 | 1.60 | 1.60 | 1.60 | 1.60 | 1.60 | 1.60 |
|  | n (B + C) | 1.61 | 1.62 | 1.61 | 1.61 | 1.61 | 1.61 | 1.64 | 1.68 |
| Refractive index difference | n (shell) − n (core) | 0.12 | 0.12 | 0.12 | 0.13 | 0.13 | 0.13 | 0.13 | 0.13 |
|  | n (B + C) − n (core) | 0.13 | 0.14 | 0.13 | 0.14 | 0.14 | 0.14 | 0.17 | 0.21 |
| Colloidal crystal cured film | Film thickness (μm) | 25 | 25 | 25 | 28 | 26 | 26 | 28 | 28 |
|  | Reflection wavelength (nm) | 535 | 610 | 615 | 587 | 583 | 580 | 606 | 606 |
|  | Reflectance (%) | 68 | 75 | 72 | 85 | 70 | 59 | 73 | 85 |
|  | Haze (%) | 7.5 | 4.8 | 5.8 | 4.7 | 4.9 | 5.8 | 7.5 | 9.2 |

TABLE 6

|  |  | Example 3-1 | Example 3-2 | Example 3-3 | Example 3-4 | Example 3-5 | Example 3-6 | Example 3-7 | Example 3-8 | Example 3-9 |
|---|---|---|---|---|---|---|---|---|---|---|
| Composition | Core-shell particle (A) | Me | Me | Me | Me | Me | Me | Me | Me | Me |
|  | Monomer (B1) | BPEA | BPEA | BPEA | BPEA | BPEA | BPEA | BPEA | BPA | BPM |
|  | Monomer (C2) | FL1A | FL1A | FL1A | FL1A | FL1A | FL1A | FL2A | FL1M | FL1A |
| Content (wt %) | Core-shell particle (A) | 40 | 40 | 40 | 32 | 32 | 60 | 40 | 40 | 50 |
|  | Monomer (B1) | 54 | 42 | 18 | 66 | 6 | 28 | 42 | 42 | 35 |
|  | Monomer (C2) | 6 | 18 | 42 | 2 | 62 | 12 | 18 | 18 | 15 |
| Usage (g) | Core-shell particle (A) | 1.00 | 1.00 | 1.00 | 0.80 | 0.80 | 1.50 | 1.00 | 1.00 | 1.25 |
|  | Monomer (B1) | 1.35 | 1.05 | 0.45 | 1.65 | 0.15 | 0.70 | 1.05 | 1.05 | 0.88 |
|  | Monomer (C2) | 0.15 | 0.45 | 1.05 | 0.05 | 1.55 | 0.30 | 0.45 | 0.45 | 0.38 |
|  | Organic solvent DGBA | 0.75 | 0.75 | 0.75 | 0.75 | 0.75 | 0.75 | 0.75 | — | — |
|  | PGMA | 0.75 | 0.75 | 0.75 | 0.75 | 0.75 | 0.75 | 0.75 | 1.50 | 1.50 |
|  | Irgacure 819 | 0.045 | 0.045 | 0.045 | 0.051 | 0.051 | 0.030 | 0.045 | 0.045 | 0.038 |
| Drying | Temperature (° C.) | 90 | 90 | 90 | 90 | 110 | 90 | 90 | 60 | 60 |
|  | Time (min) | 80 | 80 | 80 | 80 | 40 | 80 | 80 | 120 | 120 |
| Refractive index | n (core) | 1.48 | 1.48 | 1.48 | 1.48 | 1.48 | 1.48 | 1.48 | 1.48 | 1.48 |
|  | n (shell) | 1.60 | 1.60 | 1.60 | 1.60 | 1.60 | 1.60 | 1.60 | 1.60 | 1.60 |
|  | n (B + C) | 1.61 | 1.62 | 1.62 | 1.61 | 1.62 | 1.62 | 1.61 | 1.62 | 1.62 |
| Refractive index difference | n (shell) − n (core) | 0.12 | 0.12 | 0.12 | 0.12 | 0.12 | 0.12 | 0.12 | 0.12 | 0.12 |
|  | n (B + C) − n (core) | 0.13 | 0.14 | 0.14 | 0.13 | 0.14 | 0.14 | 0.13 | 0.14 | 0.14 |
| Colloidal crystal cured film | Film thickness (μm) | 25 | 26 | 25 | 24 | 25 | 27 | 25 | 26 | 27 |
|  | Reflection wavelength (nm) | 520 | 522 | 521 | 555 | 557 | 447 | 518 | 524 | 482 |
|  | Reflectance (%) | 68 | 70 | 72 | 69 | 65 | 59 | 68 | 70 | 71 |
|  | Haze (%) | 5.1 | 5.2 | 7.5 | 5.4 | 7.8 | 9.3 | 4.7 | 6.0 | 7.2 |

TABLE 7

|  |  | Example 4-1 | Example 4-2 | Example 4-3 | Example 4-4 | Example 4-5 | Example 4-6 | Example 4-7 | Example 4-8 | Example 4-9 |
|---|---|---|---|---|---|---|---|---|---|---|
| Composition | Core-shell particle (A) | Me | Me | Me | Me | Me | Me | Me | Me | Me |
|  | Monomer (B1) | BPEA | BPEA | BPEA | BPEA | BPEA | BPEA | BPEA | BPA | BPM |
|  | Monomer (C3) | BA2A | BA2A | BA2A | BA2A | BA2A | BA2A | BA1A | BA1M | BA2A |
| Content (wt %) | Core-shell particle (A) | 40 | 40 | 40 | 32 | 32 | 60 | 40 | 40 | 50 |
|  | Monomer (B1) | 54 | 42 | 18 | 66 | 6 | 28 | 42 | 42 | 35 |
|  | Monomer (C3) | 6 | 18 | 42 | 2 | 62 | 12 | 18 | 18 | 15 |
| Usage (g) | Core-shell particle (A) | 1.00 | 1.00 | 1.00 | 0.80 | 0.80 | 1.50 | 1.00 | 1.00 | 1.25 |
|  | Monomer (B1) | 1.35 | 1.05 | 0.45 | 1.65 | 0.15 | 0.70 | 1.05 | 1.05 | 0.88 |
|  | Monomer (C3) | 0.15 | 0.45 | 1.05 | 0.05 | 1.55 | 0.30 | 0.45 | 0.45 | 0.38 |
|  | Organic solvent  DGBA | 0.75 | 0.75 | 0.75 | 0.75 | 0.75 | 0.75 | 0.75 | — | — |
|  | NPAC | 0.75 | 0.75 | 0.75 | 0.75 | 0.75 | 0.75 | 0.75 | 1.50 | 1.50 |
|  | Irgacure 819 | 0.045 | 0.045 | 0.045 | 0.051 | 0.051 | 0.030 | 0.045 | 0.045 | 0.038 |
| Drying | Temperature (° C.) | 90 | 90 | 90 | 90 | 110 | 90 | 90 | 60 | 60 |
|  | Time (min) | 30 | 30 | 30 | 30 | 15 | 30 | 30 | 60 | 60 |
| Refractive index | n (core) | 1.48 | 1.48 | 1.48 | 1.48 | 1.48 | 1.48 | 1.48 | 1.48 | 1.48 |
|  | n (shell) | 1.60 | 1.60 | 1.60 | 1.60 | 1.60 | 1.60 | 1.60 | 1.60 | 1.60 |
|  | n (B + C) | 1.61 | 1.60 | 1.58 | 1.61 | 1.57 | 1.60 | 1.60 | 1.60 | 1.60 |
| Refractive index difference | n (shell) − n (core) | 0.12 | 0.12 | 0.12 | 0.12 | 0.12 | 0.12 | 0.12 | 0.12 | 0.12 |
|  | n (B + C) − n (core) | 0.13 | 0.12 | 0.10 | 0.13 | 0.09 | 0.12 | 0.12 | 0.12 | 0.12 |
| Colloidal crystal cured film | Film thickness (μm) | 26 | 25 | 25 | 26 | 24 | 28 | 25 | 25 | 27 |
|  | Reflection wavelength (nm) | 521 | 524 | 523 | 553 | 556 | 449 | 525 | 526 | 485 |
|  | Reflectance (%) | 63 | 63 | 55 | 61 | 58 | 52 | 68 | 67 | 54 |
|  | Haze (%) | 4.3 | 3.7 | 6.3 | 4.4 | 5.3 | 8.7 | 5.0 | 5.2 | 7.9 |

TABLE 8

|  |  | Example 5-1 | Example 5-2 | Example 5-3 |
|---|---|---|---|---|
| Composition | Core-shell particle (A) | Me | Me | Me |
|  | Monomer (B1) | BPEA | BPEA | BPEA |
|  | Monomer (C1) | — | PSDA | PSDA |
|  | Monomer (C2) | FL1A | — | FL1A |
|  | Monomer (C3) | BA2A | BA2A | BA2A |
| Content (wt %) | Core-shell particle (A) | 50 | 40 | 32 |
|  | Monomer (B1) | 15 | 42 | 38 |
|  | Monomer (C1) | — | 9 | 10 |
|  | Monomer (C2) | 30 | — | 10 |
|  | Monomer (C3) | 5 | 9 | 10 |
| Usage (g) | Core-shell particle (A) | 1.25 | 1.00 | 0.80 |
|  | Monomer (B1) | 0.38 | 1.05 | 0.95 |
|  | Monomer (C1) | — | 0.23 | 0.25 |
|  | Monomer (C2) | 0.75 | — | 0.25 |
|  | Monomer (C3) | 0.13 | 0.23 | 0.25 |
|  | Organic solvent  DGBA | 0.75 | 0.75 | 0.75 |
|  | PGMA | 0.75 | 0.75 | 0.75 |
|  | Irgacure 819 | 0.038 | 0.045 | 0.051 |
| Drying | Temperature (° C.) | 110 | 90 | 90 |
|  | Time (min) | 40 | 80 | 80 |
| Refractive index | n (core) | 1.48 | 1.48 | 1.48 |
|  | n (shell) | 1.60 | 1.60 | 1.60 |
|  | n (B + C) | 1.61 | 1.61 | 1.61 |
| Refractive index difference | n (shell) − n (core) | 0.12 | 0.12 | 0.12 |
|  | n (B + C) − n (core) | 0.13 | 0.13 | 0.13 |
| Colloidal crystal cured film | Film thickness (μm) | 27 | 26 | 24 |
|  | Reflection wavelength (nm) | 483 | 524 | 558 |
|  | Reflectance (%) | 65 | 72 | 59 |
|  | Haze (%) | 7.5 | 4.7 | 6.3 |

TABLE 9

|  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Composition | Core-shell particle (A) | Nj | Oe | Oe | Dc | Je | Me | Me | Me |
|  | Monomer (B1) | MyA | BPEA | BPEA | — | BPEA | BPEA | BPEA | BPEA |
|  | Monomer (C) | NDA | PSDA | MPSM | DGDM | PETA | FL1A | FL1A | FL1A |
| Content (wt %) | Core-shell particle (A) | 40 | 40 | 40 | 40 | 40 | 40 | 20 | 70 |

TABLE 9-continued

|  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Usage (g) | Monomer (B1) | 54 | 30 | 10 | — | 5 | 3 | 56 | 21 |
|  | Monomer (C) | 6 | 30 | 50 | 60 | 55 | 57 | 24 | 9 |
|  | Core-shell particle (A) | 1.00 | 1.00 | 1.00 | 1.00 | 1.00 | 1.00 | 0.50 | 1.75 |
|  | Monomer (B1) | 1.35 | 0.75 | 0.25 | — | 0.13 | 0.075 | 1.40 | 0.53 |
|  | Monomer (C) | 0.15 | 0.75 | 1.25 | 1.50 | 1.38 | 1.43 | 0.60 | 0.23 |
|  | Organic solvent DGBA | 1.50 | 0.75 | 1.50 | — | 0.75 | 0.75 | 0.75 | 0.75 |
|  | EGMA | — | 0.75 | — | 1.50 | 0.75 | 0.75 | 0.75 | 0.75 |
|  | Irgacure 819 | 0.045 | 0.045 | 0.045 | 0.045 | 0.045 | 0.045 | 0.075 | 0.023 |
| Drying | Temperature (° C.) | 80 | 90 | 110 | 40 | 90 | 90 | 90 | 90 |
|  | Time (min) | 120 | 120 | 120 | 120 | 120 | 80 | 80 | 80 |
| Refractive index | n (core) | 1.60 | 1.58 | 1.56 | 1.50 | 1.47 | 1.48 | 1.48 | 1.48 |
|  | n (shell) | 1.48 | 1.60 | 1.60 | 1.59 | 1.60 | 1.60 | 1.60 | 1.60 |
|  | n (B + C) | 1.49 | 1.61 | 1.67 | 1.50 | 1.53 | 1.63 | 1.62 | 1.62 |
| Refractive index difference | n (shell) − n (core) | −0.21 | 0.04 | 0.04 | 0.09 | 0.13 | 0.12 | 0.12 | 0.12 |
|  | n (B + C) − n (core) | −0.11 | 0.05 | 0.11 | 0.00 | 0.06 | 0.15 | 0.14 | 0.14 |
| Colloidal crystal cured film | Film thickness (μm) | 26 | 28 | 26 | 24 | 24 | 25 | 27 | 25 |
|  | Reflection wavelength (nm) | 580 | 565 | 609 | 580 | 558 | 522 | — | 407 |
|  | Reflectance (%) | 51 | 25 | 32 | 16 | 28 | 52 | — | 15 |
|  | Haze (%) | 21.0 | 3.2 | 13.2 | 4.9 | 23.0 | 18.0 | 9.5 | 33.0 |

In the results of Examples 1-1 to 5-3, in which n(shell)−n(core) was 0.07 or more, n(B)−n(core) or n(B+C)−n(core) was 0.07 or more, and the amounts of components (A) to (C) were in the predetermined ranges, the colloidal crystal cured films manufactured using the compositions for colloidal crystals had a reflectance of 50% or more at a reflection peak and a haze of 10% or less.

In the results of Comparative Examples 1 to 5, in which n(shell)−n(core) was less than 0.07, or n(B)−n(core) or n(B+C)−n(core) was less than 0.07, the colloidal crystal cured films manufactured using the compositions for colloidal crystals had a reflectance of less than 50%, or had an increased haze and was cloudy. Thus, bright structural color could not be visually recognized. The results of Comparative Example 6 show that the colloidal crystal cured film manufactured using the composition for colloidal crystals having a monomer (B1) content of less than 5% by weight had a high haze and was cloudy. The results of Comparative Example 7 show that the colloidal crystal cured film manufactured using the composition for colloidal crystals having the core-shell particles (A) content of less than 25% by weight had no reflection peak. The results of Comparative Example 8 show that the colloidal crystal cured film manufactured using the composition for colloidal crystals having the core-shell particles (A) content of more than 65% by weight had a reflectance of less than 50%.

A composition for colloidal crystals according to the present disclosure can be formed into a colloidal crystal cured film through simple procedures of application, drying, and ultraviolet irradiation. This advantageously allows the manufacture of a colloidal crystal cured film on formed products as well as plane substrates. The resulting colloidal crystal cured film has high reflectance and low haze and consequently excellent optical properties and can be visually recognized as a bright structural color. Thus, it is useful for optical functional materials, such as coloring materials. Furthermore, depending mainly on the particle size, a colloidal film having a reflection peak for ultraviolet light to visible light and infrared light can be manufactured and is useful for various optical elements.

The invention claimed is:

1. A composition for colloidal crystals, comprising: core-shell particles (A) each having a core and a shell; and a monomer (B1) having the following formula (1),
   wherein the core-shell particles (A) constitute 25% to 65% by weight of the composition, and the monomer (B1) constitutes 35% to 75% by weight of the composition,
   the core has an average particle size in the range of 50 to 900 nm,
   the shell is formed of a linear polymer composed of at least one of styrene and a monomer (B2) having the following formula (1),
   one end of the linear polymer is covalently bonded to the core, and
   the refractive index of the core (n(core)) satisfies the following formulae (2) and (3):

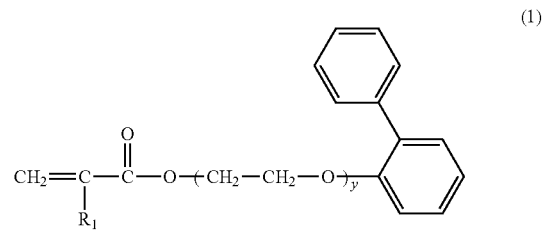

(1)

wherein $R_1$ denotes a hydrogen atom or a methyl group, and y is 0 or 1, $$n(\text{shell}) - n(\text{core}) \geq 0.07 \quad (2)$$

wherein n(shell) denotes the refractive index of the shell, and $$n(B) - n(\text{core}) \geq 0.07 \quad (3)$$

wherein n(B) denotes the refractive index of the monomer (B1) after curing.

2. The composition for colloidal crystals according to claim 1, further comprising 0.1 to 10 parts by weight of a polymerization initiator per 100 parts by weight of the composition for colloidal crystals.

3. The composition for colloidal crystals according to claim 1, further comprising 5 to 500 parts by weight of an organic solvent per 100 parts by weight of the composition for colloidal crystals.

4. A method for manufacturing a colloidal crystal cured film having a thickness in the range of 1 to 100 μm, comprising:
   a) applying the composition according to claim 3 to a substrate, and then evaporating the organic solvent to form colloidal crystals, and
   b) curing the crystallized composition using heat or an active energy beam.

5. A colloidal crystal cured film manufactured by curing the composition for colloidal crystals according to claim 1 using heat or an active energy beam,
   wherein the colloidal crystal cured film has a thickness in the range of 1 to 100 μm.

6. A composition for colloidal crystals, comprising: core-shell particles (A) each having a core and a shell; and a mixture of a monomer (B1) having the following formula (1) and a monomer (C1) having the following formula (4),
   wherein the core-shell particles (A) constitute 25% to 65% by weight of the composition, and the mixture constitutes 35% to 75% by weight of the composition, the monomer (B1) constituting 5% by weight or more of the composition, the monomer (C1) constituting 70% by weight or less of the composition,
   the core has an average particle size in the range of 50 to 900 nm,
   the shell is formed of a linear polymer composed of at least one of styrene and a monomer (B2) having the following formula (1),
   one end of the linear polymer is covalently bonded to the core, and
   the refractive index of the core (n(core)) satisfies the following formulae (2) and (5):

wherein $R_2$ denotes a hydrogen atom or a methyl group, X denotes an oxygen atom or a sulfur atom, and z is 0 or 1, $$n(\text{shell}) - n(\text{core}) \geq 0.07 \quad (2)$$

wherein n(shell) denotes the refractive index of the shell, and $$n(B+C) - n(\text{core}) \geq 0.07 \quad (5)$$

wherein n(B+C) denotes the refractive index of the mixture after curing.

7. A composition for colloidal crystals, comprising: core-shell particles (A) each having a core and a shell; and a mixture of a monomer (B1) having the following formula (1) and a monomer (C2) having the following formula (6),
   wherein the core-shell particles (A) constitute 25% to 65% by weight of the composition, and the mixture constitutes 35% to 75% by weight of the composition, the monomer (B1) constituting 5% by weight or more of the composition, the monomer (C2) constituting 70% by weight or less of the composition,
   the core has an average particle size in the range of 50 to 900 nm,
   the shell is formed of a linear polymer composed of at least one of styrene and a monomer (B2) having the following formula (1),
   one end of the linear polymer is covalently bonded to the core, and
   the refractive index of the core (n(core)) satisfies the following formulae (2) and (7):

$$CH_2=C(R_1)-C(=O)-O-(CH_2-CH_2-O)_y-\text{biphenyl} \quad (1)$$

wherein $R_1$ denotes a hydrogen atom or a methyl group, and y is 0 or 1, $$CH_2=C(R_1)-C(=O)-O-(CH_2-CH_2-O)_y-\text{biphenyl} \quad (1)$$

wherein $R_1$ denotes a hydrogen atom or a methyl group, and y is 0 or 1, $$CH_2=C(R_2)-C(=O)-X-(CH_2-CH_2-X)_z-\text{C}_6\text{H}_4-S-\text{C}_6\text{H}_4-(X-CH_2-CH_2)_z-X-C(=O)-C(R_2)=CH_2 \quad (4)$$

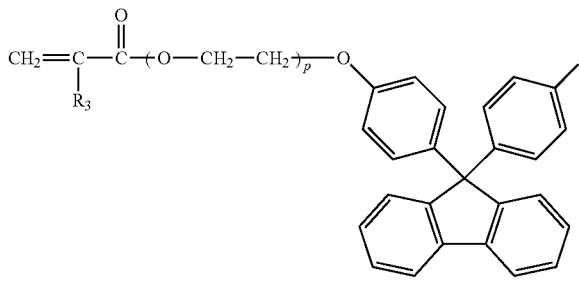
(6)

wherein $R_3$ denotes a hydrogen atom or a methyl group, and p is 1 or 2, $$n(\text{shell}) - n(\text{core}) \geq 0.07 \quad (2)$$

wherein n(shell) denotes the refractive index of the shell, and $$n(B+C) - n(\text{core}) \geq 0.07 \quad (7)$$

wherein n(B+C) denotes the refractive index of the mixture after curing.

8. A composition for colloidal crystals, comprising: core-shell particles (A) each having a core and a shell; and a mixture of a monomer (B1) having the following formula (1) and a monomer (C3) having the following formula (8), wherein the core-shell particles (A) constitute 25% to 65% by weight of the composition, and the mixture constitutes 35% to 75% by weight of the composition, the monomer (B1) constituting 5% by weight or more of the composition, the monomer (C3) constituting 70% by weight or less of the composition, the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (2) and (9):

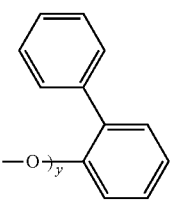
(1)

wherein $R_1$ denotes a hydrogen atom or a methyl group, and y is 0 or 1, wherein $R_4$ denotes a hydrogen atom or a methyl group, and q is 1 or 2, $$n(\text{shell}) - n(\text{core}) \geq 0.07 \quad (2)$$

wherein n(shell) denotes the refractive index of the shell, and $$n(B+C) - n(\text{core}) \geq 0.07 \quad (9)$$

wherein n(B+C) denotes the refractive index of the mixture after curing.

9. A composition for colloidal crystals, comprising: core-shell particles (A) each having a core and a shell; and a mixture of a monomer (B1) having the following formula (1) and a monomer (C), wherein the core-shell particles (A) constitute 25% to 65% by weight of the composition, and the mixture constitutes 35% to 75% by weight of the composition, the monomer (B1) constituting 5% by weight or more of the composition, the monomer (C) constituting 70% by weight or less of the composition, the monomer (C) includes at least two of a monomer (C1) having the following formula (4), a monomer (C2) having the following formula (6), and a monomer (C3) having the following formula (8), the core has an average particle size in the range of 50 to 900 nm, the shell is formed of a linear polymer composed of at least one of styrene and a monomer (B2) having the following formula (1), one end of the linear polymer is covalently bonded to the core, and the refractive index of the core (n(core)) satisfies the following formulae (2) and (10):

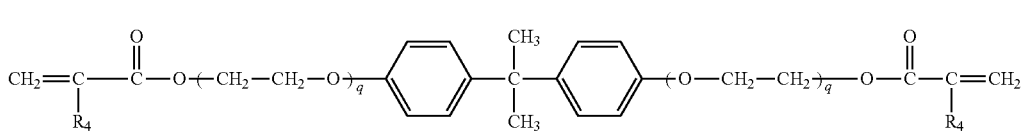
(8)

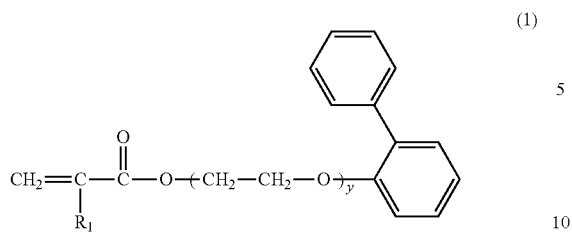
(1)

wherein $R_1$ denotes a hydrogen atom or a methyl group, and y is 0 or 1,

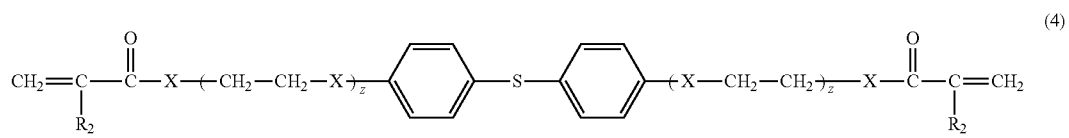
(4)

wherein $R_2$ denotes a hydrogen atom or a methyl group, X denotes an oxygen atom or a sulfur atom, and z is 0 or 1,

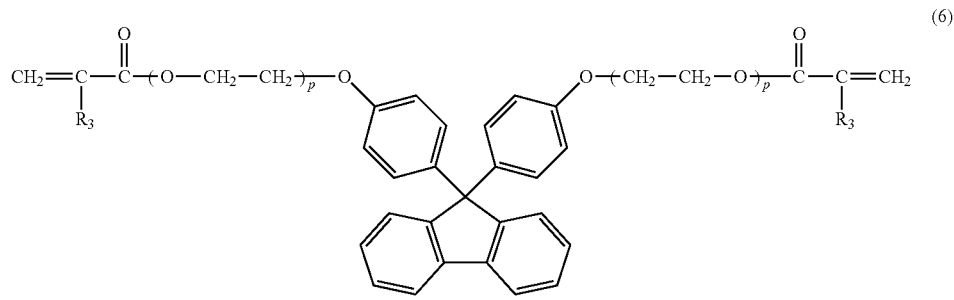
(6)

wherein $R_3$ denotes a hydrogen atom or a methyl group, and p is 1 or 2,

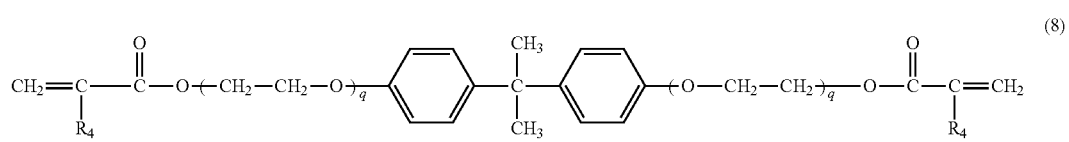
(8)

wherein $R_4$ denotes a hydrogen atom or a methyl group, and q is 1 or 2, $$n(\text{shell}) - n(\text{core}) \geq 0.07 \quad (2)$$

wherein n(shell) denotes the refractive index of the shell, and $$n(B+C) - n(\text{core}) \geq 0.07 \quad (10)$$

wherein n(B+C) denotes the refractive index of the mixture after curing.

* * * * *